(12) United States Patent
Son et al.

(10) Patent No.: US 9,940,087 B2
(45) Date of Patent: Apr. 10, 2018

(54) METHOD FOR DISPLAYING IMAGE AND ELECTRONIC DEVICE THEREOF

(71) Applicant: Samsung Electronics Co., Ltd., Gyeonggi-do (KR)

(72) Inventors: Jihyoung Son, Seoul (KR); Namho Kim, Seoul (KR); Jeong Min Kim, Gyeonggi-do (KR); Sung-Ho Shim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 67 days.

(21) Appl. No.: 14/947,082

(22) Filed: Nov. 20, 2015

(65) Prior Publication Data

US 2016/0147498 A1 May 26, 2016

(30) Foreign Application Priority Data

Nov. 21, 2014 (KR) .......................... 10-2014-0163661

(51) Int. Cl.
*G09G 5/00* (2006.01)
*G06F 3/14* (2006.01)
(Continued)

(52) U.S. Cl.
CPC ............ *G06F 3/1454* (2013.01); *A63F 13/26* (2014.09); *A63F 13/323* (2014.09);
(Continued)

(58) Field of Classification Search
CPC ........ G06F 3/1454; G06F 3/041; G06F 3/005; A63F 13/323; A63F 13/837; A63F 13/26; A63F 2300/403; A63F 2300/609; A63F 2300/6653; A63F 2300/303; A63F 2300/301; A63F 2300/204;
(Continued)

(56) References Cited

U.S. PATENT DOCUMENTS

2002/0165028 A1 11/2002 Miyamoto et al.
2003/0216177 A1 11/2003 Aonuma et al.
(Continued)

FOREIGN PATENT DOCUMENTS

CN 102441276 A 5/2012
CN 102547173 A 7/2012
(Continued)

OTHER PUBLICATIONS

European Search Report dated Mar. 4, 2016.
(Continued)

*Primary Examiner* — Adam R Giesy
(74) *Attorney, Agent, or Firm* — Cha & Reiter, LLC

(57) ABSTRACT

According to various embodiments, an operating method for a first electronic device may include: synchronizing a main scene displayed on a second electronic device with the progress of a specific application; determining a sub-scene relating to the main scene through the specific application; and displaying the sub-scene on the first electronic device. An operating method for an electronic device is not limited to the above described method, and other embodiments can be made within the same or similar scope as the present disclosure.

20 Claims, 13 Drawing Sheets

(51) Int. Cl.
*A63F 13/26* (2014.01)
*G06F 3/00* (2006.01)
*G06F 3/041* (2006.01)
*G06T 1/20* (2006.01)
*G06T 3/40* (2006.01)
*A63F 13/837* (2014.01)
*A63F 13/323* (2014.01)
*H04M 1/725* (2006.01)

(52) U.S. Cl.
CPC ............ *A63F 13/837* (2014.09); *G06F 3/005* (2013.01); *G06F 3/041* (2013.01); *G06T 1/20* (2013.01); *G06T 3/40* (2013.01); *A63F 2300/1087* (2013.01); *A63F 2300/204* (2013.01); *A63F 2300/301* (2013.01); *A63F 2300/303* (2013.01); *A63F 2300/403* (2013.01); *A63F 2300/609* (2013.01); *A63F 2300/6653* (2013.01); *A63F 2300/8076* (2013.01); *G09G 2340/045* (2013.01); *G09G 2340/0407* (2013.01); *G09G 2354/00* (2013.01); *H04M 1/7253* (2013.01); *H04M 1/72544* (2013.01)

(58) Field of Classification Search
CPC ..... A63F 2300/1087; A63F 2300/8076; G06T 3/40; G06T 1/20; G07F 17/32; G07F 17/3211; G07F 17/3218; H04M 1/7253; H04M 1/72544; G09G 2340/0407; G09G 2340/045; G09G 2354/00
See application file for complete search history.

(56) References Cited

U.S. PATENT DOCUMENTS

| | | | |
|---|---|---|---|
| 2012/0040719 A1* | 2/2012 | Lee | G06F 1/1626 455/557 |
| 2012/0086630 A1 | 4/2012 | Zhu et al. | |
| 2012/0190442 A1* | 7/2012 | Ito | A63F 13/10 463/31 |
| 2012/0249424 A1* | 10/2012 | Bove | A63F 13/211 345/158 |
| 2013/0033435 A1* | 2/2013 | Raveendran | G06F 3/0481 345/173 |
| 2014/0304335 A1* | 10/2014 | Fung | H04L 67/38 709/204 |
| 2016/0147417 A1* | 5/2016 | Chang | G06F 3/1454 715/739 |

FOREIGN PATENT DOCUMENTS

| | | |
|---|---|---|
| CN | 103155425 A | 6/2013 |
| CN | 103339590 A | 10/2013 |
| EP | 2 441 505 A2 | 4/2012 |
| EP | 2 532 399 A1 | 12/2012 |
| KR | 10-2013-0109904 A | 10/2013 |

OTHER PUBLICATIONS

European Search Report, dated Jul. 28, 2016.
European Search Report dated Oct. 9, 2017.
Chinese Search Report dated Feb. 5, 2018.

* cited by examiner

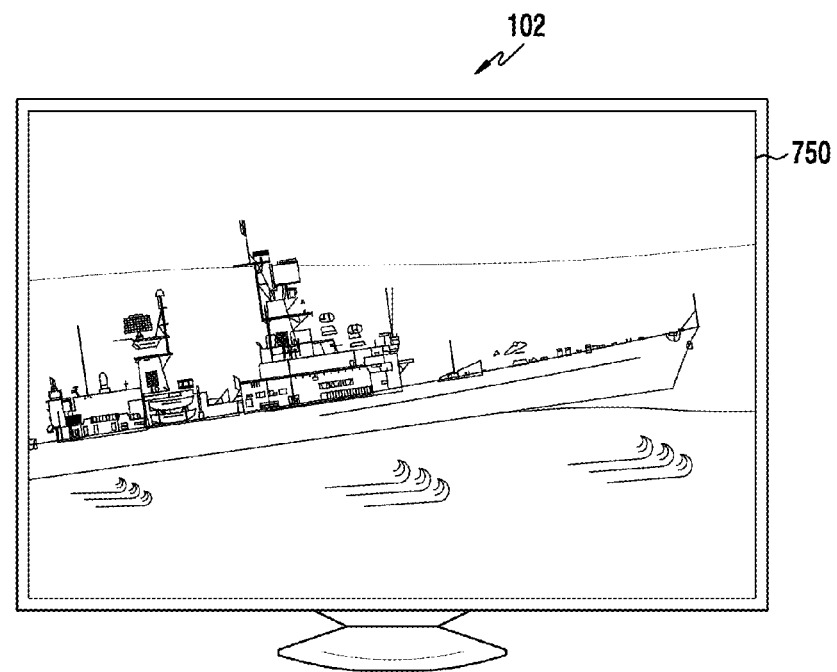
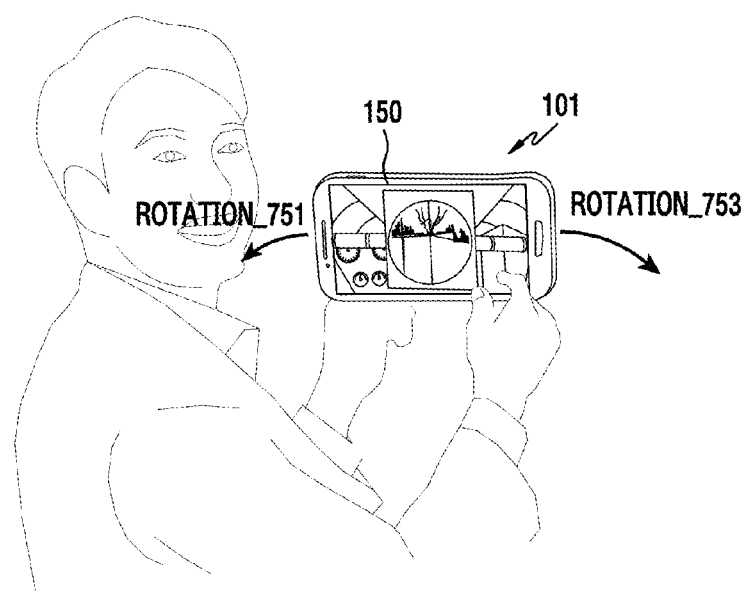
FIG.7

METHOD FOR DISPLAYING IMAGE AND ELECTRONIC DEVICE THEREOF

CLAIM OF PRIORITY

This application claims priority from and benefit under 35 U.S.C. § 119(a) to Korean Application Serial No. 10-2014-0163661, which was filed in the Korean Intellectual Property Office on Nov. 21, 2014, and which is incorporated herein by reference in its entirety.

TECHNICAL FIELD

The present disclosure relates to method for displaying an image, and an electronic device thereof.

BACKGROUND

In a multi-screen (or multi-display) service, a plurality of electronic devices can share a screen or control a screen remotely. For example, a multi-screen game usually involves an electronic device that displays an execution screen and an electronic device that controls actions and inputs displayed on the execution screen. In the case of the multi-screen game, the electronic device that displays an execution screen may be, for example, a television, and an input device may be a portable terminal (e.g., a virtual joystick or game controller). That is, a portable terminal may be used as an input device in the multi-screen game that uses a television.

When a multi-screen service is performed such that a plurality of electronic devices share a screen or control a screen remotely, an electronic device that displays a main screen typically displays a multi-screen function, and another electronic device is typically used as an input device to remotely control the electronic device that displays the multi-screen. However, it is possible that the multi-screen function service may also be developed to share content in various forms between electronic devices.

Therefore, there is a need in the art to provide a multi-screen function service which shares content in various forms between electronic devices.

SUMMARY

An aspect of the present disclosure is to provide an operating method for a first electronic device including: establishing, by the first electronic device, a communication link with a second electronic device; synchronizing an image displayed on the second device for display on the first electronic device; and in response to determining a portion of the image selected on the second electronic device, displaying the selected portion of the image from the second electronic device on the first electronic device.

Another aspect of the present disclosure is to provide an electronic device, which may include a communication module; a display module; and at least one processor that controls the communication module and the display module, such that the at least one processor is configured to: establish, by the first electronic device, a communication link with a second electronic device; synchronize an image displayed on the second device for display on the first electronic device; in response to determining a portion of the image selected on the second electronic device, display the selected portion of the image from the second electronic device on the first electronic device.

BRIEF DESCRIPTION OF THE DRAWINGS

The present disclosure will be more apparent from the following detailed description taken in conjunction with the accompanying drawings, in which:

FIG. 7 illustrates an operation of displaying a specified scene on a display of an electronic device according to various embodiments;

DETAILED DESCRIPTION

Figure 1:
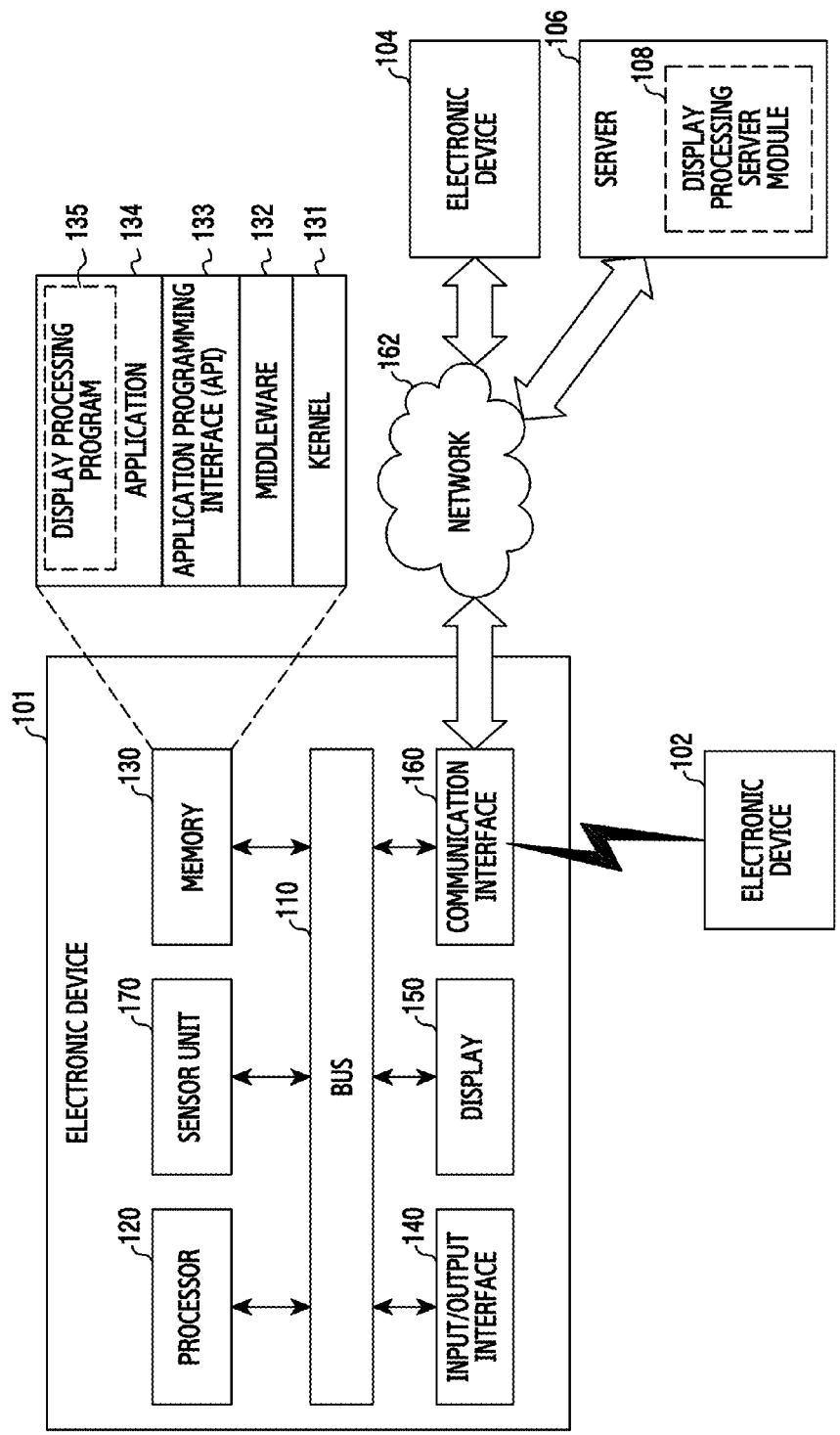
FIG. 1 illustrates a network environment including electronic devices according to various embodiments of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the present disclosure. In addition, descriptions of well-known functions and implementations are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or program module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic accessory, an electronic tattoo, a smart mirror, or a smart watch).

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; or various measuring instruments (e.g., a water meter, an electricity meter, a gas meter, or a wave meter).

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

FIG. 1 is a block diagram of an electronic device according to an embodiment of the present disclosure.

Referring to FIG. 1, an electronic device 101 may include a bus 110, a processor 120, a memory 130, an input/output interface 140, a display (e.g., touch screen) 150, and a communication interface 160. According to various embodiments of the present disclosure, at least one of the components of the electronic device 101 may be omitted, or other components may be additionally included in the electronic device 101.

The bus 110 may be a circuit that connects the processor 120, the memory 130, the input/output interface 140, the display 150, or the communication interface 160 and transmits communication (for example, control messages) between the above described components.

The processor 120 may carry out operations or data processing related to control and/or communication of at least one other component (for example, the memory 130, the input/output interface 140, the display 150, or the communication interface 160) of the electronic device 101.

At least one processor 120 may be included in the electronic device 101 to perform a specified function of the electronic device 101. According to an embodiment, the processor 120 may include one or more application processors (APs) and one or more microcontroller units (MCUs). According to another embodiment, the processor 120 may include one or more microcontroller units as applications, or may be functionally connected to one or more microcontroller units. In FIG. 1, the APs and the MCUs may be included in one IC package, or may be separately configured to be included in different IC packages, respectively. According to an embodiment, the MCUs may also be included in an IC package of the APs so as to be configured as one IC package together with the APs. Although the processor 120 is illustrated as including the APs or the MCUs, it is nothing more than an embodiment for clear understanding, and it is apparent that the processor 120 may also perform the operations of the APs and/or the MCUs.

The APs may control a plurality of hardware or software elements connected thereto and may perform processing and operations on various types of data including multimedia data by driving an operating system or application programs (or applications). The APs may be embodied as, for example, a System on Chip (SoC). According to an embodiment, the processor 120 may further include a graphic processing unit (GPU) (not illustrated).

The MCUs may be processors configured to perform specified operations. According to an embodiment, the MCUs may acquire sensing information through one or more specified motion sensors (e.g., a gyro sensor, an acceleration sensor, and a geomagnetic sensor), compare the acquired sensing information, and determine the respective operating states of the specified sensors with reference to a database of the electronic device 101.

According to an embodiment, the APs or the MCUs may load instructions or data received from at least one of non-volatile memories or other elements connected thereto in volatile memories, and may process the loaded instructions or data. Furthermore, the APs or the MCUs may store data received from or generated by at least one of the other elements in the non-volatile memories.

The memory 130 may store commands or data (e.g., a reference pattern or a reference touch area) associated with one or more other components of the electronic device 101. According to one embodiment, the memory 130 may store software and/or a program. For example, the program may include a kernel 131, a middleware 132, an API (Application Programming Interface) 133, an application program 134, or the like. At least some of the kernel 131, the middleware 132, and the API 133 may be referred to as an OS (Operating System).

The kernel 131 may control or manage system resources (e.g., the bus 110, the processor 120, or the memory 130) used for performing an operation or function implemented by the other programs (e.g., the middleware 132, the API 133, or the applications 134). Furthermore, the kernel 131 may provide an interface through which the middleware 132, the API 133, or the applications 134 may access the individual elements of the electronic device 101 to control or manage the system resources.

The middleware 132, for example, may function as an intermediary for allowing the API 133 or the applications 134 to communicate with the kernel 131 to exchange data.

In addition, the middleware 132 may process one or more task requests received from the applications 134 according to priorities thereof. For example, the middleware 132 may assign priorities for using the system resources (e.g., the bus 110, the processor 120, the memory 130, or the like) of the electronic device 101, to at least one of the applications 134. For example, the middleware 132 may perform scheduling or loading balancing on the one or more task requests by processing the one or more task requests according to the priorities assigned thereto.

The API 133 is an interface through which the applications 134 control functions provided from the kernel 131 or the middleware 132, and may include, for example, at least one interface or function (e.g., instruction) for file control, window control, image processing, or text control.

The applications 134 may include a short message service (SMS)/multimedia message service (MMS) application, an e-mail application, a calendar application, an alarm application, a health care application (e.g., an application for measuring physical activity or blood glucose), and an environmental information application (e.g., an application for providing atmospheric pressure, humidity, or temperature information). The applications (or processors) 134 may include an application associated with the exchange of information between the electronic device 101 and an external electronic device (e.g., an electronic device 102 or 104). The application associated with the exchange of information may include, for example, a notification relay application for transferring specific information to an external electronic device or a device management application for managing an external electronic device. The notification relay application may, for example, include a function of transferring, to an external electronic device (e.g., the electronic device 104), notification information generated by other applications (e.g., an SMS/MMS application, an e-mail application, a health care application, or an environmental information application) of the electronic device 101.

Additionally or alternatively, the notification relay application may receive notification information from, for example, an external electronic device (e.g., the electronic device 104) and provide the received notification information to a user. The device management application may, for example, manage (e.g., install, delete, or update) functions for at least a part of an external electronic device (e.g., the electronic device 104) communicating with the electronic device 101 (e.g., turning on/off the external electronic device itself (or some elements thereof) or adjusting the brightness (or resolution) of a display), applications operating in the external electronic device, or services (e.g., a telephone call service or a message service) provided by the external electronic device. According to various embodiments, the applications 134 may include an application specified according to the attribute (e.g., type) of an external electronic device (e.g., the electronic device 102 or 104). For example, in instances in which an external electronic device is an MP3 player, the applications 134 may include an application relating to the reproduction of music. Similarly, in instances in which an external electronic device is a mobile medical appliance, the applications 134 may include an application relating to health care. According to an embodiment, the applications 134 may include at least one of applications specified to the electronic device 101 and applications received from an external electronic device (e.g., a server 106 or the electronic device 104).

In the various embodiments of the present disclosure, the display processing program 135 included in the applications 134 may be provided, or the display processing program 135 may be stored as a separate program in the memory 130.

According to various embodiments, the display processing program 135 may synchronize a main scene or image displayed on a counterpart electronic device connected thereto with the progress of a specific program, determine a sub-scene or sub image relating to the main scene from the specific program, and display the sub-scene on the electronic device. According to an embodiment, the specific program may be all or a part of a program that displays the main scene on the counterpart electronic device and may be stored in the electronic device. According to an embodiment, the display processing program 135 may control the sub-scene and synchronize a scene displayed on a display of the counterpart electronic device with the controlled sub-scene. According to an embodiment, the display processing program 135 may determine a partial area of the main scene and display the sub-scene by changing at least one of the size and the brightness of the determined partial area. According to an embodiment, the display processing program 135 may display the determined area on the full screen of a display of the electronic device. According to an embodiment, the display processing program 135 may determine the partial area by at least one input among the camera photography of the electronic device and a user touch and may display the determined partial area to be the sub-scene through display coordinate synchronization between the counterpart electronic device and the electronic device.

According to an embodiment, the display processing program 135 may display a remote controller shape of a graphic image for controlling the main scene and a touch button as the sub-scene. According to an embodiment, the display processing program 135 may determine a partial area of a scene displayed on the counterpart electronic device and display one of preset sub-images as the sub-scene to correspond to the determined area. According to an embodiment, the display processing program 135 may acquire one of preset images to display the sub-scene such that the sub-scene interworks with the main scene.

According to an embodiment, the display processing program 135 may process the sub-images that interwork with a partial area of the main scene and are stored in at least one of the counterpart electronic device and the electronic device as an image of a different scene from the main scene.

According to an embodiment, the display processing program 135 may change the sub-scene according to a sensed value of at least one of an acceleration sensor, a tilt sensor, a speed sensor, and a gyroscope sensor of the electronic device and display the changed sub-scene. According to an embodiment, the display processing program 135 may display a scene associated with the main scene as the sub-scene based on at least one of a scenario and an event of the specific program.

According to various embodiments, the display processing program 135 may control a communication module to simultaneously execute a specific program through pairing with a counterpart electronic device, may control a display module to display a user interface scene for controlling the counterpart electronic device, and may display a sub-scene associated with a display scene of the counterpart electronic device based on at least one of a scenario and an event of the specific program.

According to an embodiment, the electronic device includes a touch screen, the counterpart electronic device may include a screen larger than the touch screen, and the specific program may be a multi-screen game program. According to an embodiment, the display processing program 135 may control the display module to display a remote controller shape of a graphic image for controlling the counterpart electronic device and a touch button as the user interface scene. According to an embodiment, the display processing program 135 may determine a partial area of a display scene of the counterpart electronic device based on at least one of a scenario and an event of the specific program, and may display the sub-scene by changing at least one of the size and the brightness of the determined area. According to an embodiment, the display processing program 135 may determine the partial area by at least one input among the camera photography of the electronic device and a user touch and may display the determined partial area to be the sub-scene through display coordinate synchronization between the counterpart electronic device and the electronic device.

Here, the terms "scenario" and "event" are distinguished from each other according to the meanings thereof, and may be defined as a general meaning of a scenario or event. In the various embodiments of the present disclosure, an event may be defined as an incident that occurs when a specific portion of a scenario proceeds. In addition, a scenario may represent the progress of an overall story, and an event may represent the progress of a portion of a scenario. Further, a scenario may represent a main story, and an event may represent a sub-story corresponding to a portion of a proceeding scenario. Although a scenario is defined as a superordinate concept to an event in the above description, the present disclosure is not limited thereto, and it is apparent that an event may be a super-ordinate concept to a scenario. In the following description, the term "event" may be used without distinction between a scenario and an event. According to an embodiment, the display processing program 135 may determine a partial area of the display scene of the counterpart electronic device based on at least one of a scenario and an event of the specific program and may acquire one of preset sub-images to display the sub-scene such that the sub-scene interworks with the determined area. According to an embodiment, the display processing program 135 may make a partial area of the display scene of the counterpart electronic device and the sub-images interwork with each other. The display processing program 135 may store the sub-images as images of a different scene from the display scene in at least one of the counterpart electronic device and the electronic device. According to an embodiment, based on at least one of a scenario and an event of the specific program, the display processing program 135 may acquire one of preset sub-images to display the sub-scene such that the sub-scene interworks with the display scene of the counterpart electronic device. According to an embodiment, the display processing program 135 may make the display scene of the counterpart electronic device and the sub-images interwork with each other. The display processing program 135 may store the sub-images, as images of a different scene from the display scene, in at least one of the counterpart electronic device and the electronic device. According to an embodiment, the display processing program 135 may change images according to the detected value of at least one of an acceleration sensor, a tilt sensor, a speed sensor, and a gyroscope sensor and display the changed images.

The input/output interface 140 may forward instructions or data input from a user through an input/output device (e.g., various sensors, such as an acceleration sensor or a gyro sensor, and/or a device such as a keyboard or a touch screen), to the processor 120, the memory 130, or the communication interface 160 through the bus 110. For example, the input/output interface 140 may provide the processor 120 with data on a user' touch entered on a touch screen. Furthermore, the input/output interface 140 may output instructions or data, received from, for example, the processor 120, the memory 130, or the communication interface 160 via the bus 110, through an output unit (e.g., a speaker or the display 150). For example, the input/output interface 140 may output voice data processed by the processor 120 to a user through a speaker.

The display 150 may display various types of information (e.g., multimedia data or text data) to a user. In addition, the display 150 may include an input unit and may also be configured with a touch screen to which an instruction is input by a touch or by a proximity touch of the input unit on the display 150.

The communication interface 160 (e.g., a communication module 220) may establish a communication connection between the electronic device 101 and an external device (e.g., the electronic device 104 or the server 106). For example, the communication interface 160 may be connected to a network 162 through wireless or wired communication to communicate with an external device. The wireless communication may include at least one of, for example, Wi-Fi, Bluetooth (BT), near field communication (NFC), a global positioning system (GPS), and cellular communication (e.g., LTE, LTE-A, CDMA, WCDMA, UMTS, WiBro, GSM, etc.). The wired communication may include at least one of, for example, a universal serial bus (USB), a high definition multimedia interface (HDMI), recommended standard 232 (RS-232), and a plain old telephone Service (POTS).

According to an embodiment, the network 162 may be a telecommunication network. The communication network may include at least one of a computer network, the Internet, the Internet of Things, and a telephone network. According to an embodiment, at least one of the applications 134, the application programming interface 133, the middleware 132, the kernel 131, and the communication interface 160 may support a protocol (e.g., a transport layer protocol, a data link layer protocol, or a physical layer protocol) for communication between the electronic device 101 and an external device.

According to an embodiment, the server 106 may support the driving of the electronic device 101 by performing at least one of the operations (or functions) implemented in the electronic device 101. For example, the server 106 may include a server module (e.g., a server controller or a server process, not illustrated) that may support the processor 120 which controls the electronic device 101 to perform various embodiments of the present disclosure to be described below or a specific module specified to perform the various embodiments. For example, the server module may include at least one element of the processor 120 or the specific module to perform at least one of the operations performed by the processor 120 or the specific module (e.g., perform the operations on behalf of the processor 120 or the specific module). According to various embodiments, the server module may be represented as an interworking processing server module 108 of FIG. 1.

According to an embodiment, the electronic device 101 may establish a communication connection with at least one electronic device (e.g., the electronic device 102) via the communication interface 160. The electronic device communicates with another electronic device (e.g., the electronic device 102) using the near field communication system. The near field communication system includes Wi-Fi (Wireless Fidelity), Bluetooth (BT), Bluetooth low energy (BLE), near field communication (NFC), near field magnetic induction (NFMI) and frequency modulation (FM).

The electronic device 101 may be connected to the electronic device 102 through a network communication to perform a pairing operation.

According to various embodiments, the electronic device 101 may simultaneously execute a specific program along with the electronic device 102. The electronic device 101, when simultaneously executing the specific program along with the electronic device 102, may perform a synchronization operation at least once while executing the specific program. According to an embodiment, the electronic device 101 may be connected to the electronic device 102 through the communication interface 160 by using network communication (e.g., short-range wireless communication). The electronic device 101 may simultaneously execute the specific program along with the electronic device 102 through short-range wireless communication.

In the execution of the specific program, the electronic device 101 and 102 may include the specific program therein. Alternatively, at least one device (e.g., the electronic device 102) may include the whole specific program, and the electronic device 101 may include at least a part of the specific program (e.g., a part corresponding to a specific event or a specific scenario). According to an embodiment, the electronic device 101 and/or the electronic device 102 may perform a synchronization operation in the process of starting the specific program. For example, in cases where a time point when the electronic device 101 executes the specific program is not identical to that when the electronic device 102 executes the specific program, there may be a difference in the speed by which an event (or scenario) of the specific program proceeds. In addition, in cases where a data processing speed of the electronic device 101 is not equal to that of the electronic device 102, there may also be a difference in the speed by which an event of the specific program proceeds. When executing the specific program, the electronic device 101 may perform a synchronization process for determining (reconciling) a progress time of the event of the specific program along with the electronic device 102. For example, the electronic device 101 may synchronize the specific program and/or the progress time of the event by transmitting and receiving packet data for the specific program and/or the progress time of the event that proceeds in the specific program. In order to synchronize the specific program that the electronic device 101 simultaneously executes along with the electronic device 102 and/or the progress time of the event, the electronic device 101 may synchronize the progress time with the electronic device 102 at a specified time point, such as a time point when the specific program is executed, a time point when the event of the program is executed, a time point when the event of the program ends, a time point when a scenario of the program is executed, or a time point when the scenario of the program ends. The electronic device 101, when displaying a scene of a specific program with the electronic device 102, may distinguish the display of the electronic device 102 and the display 150 of the electronic device 101 as a main display and a sub-display, respectively. According to an embodiment, when the electronic devices 101 and 102 execute a specific program (e.g., a game program), a scene corresponding to a main scenario of the specific program may be displayed through the display of the electronic device 102, and a scene corresponding to a sub-scenario (and/or a specific event) may be displayed through the display 150 of the electronic device 101. The electronic device 101, when displaying a scene corresponding to a specific event on the display 150, may receive data for requesting the progress of the specific event from the electronic device 102 that proceeds with a main scenario at a time point when the event starts. Here, the specific event includes at least one of an event which a part of the display in the electronic device 101 zooms in or out, a predefined event included in a scenario and an event which a view point of at least one object displayed in the electronic device 101 is changed, etc. Alternatively, the electronic device 101 may determine a start time of a specific event irrespective of a scenario with which the electronic device 102 proceeds, based on the progress time of the electronic device 101 (e.g., a scenario progress time of a specific program) while being synchronized with the electronic device 102 periodically at a specified time interval or at a specific time point. The electronic device 101 may display a scene corresponding to the specific event on the display 150 of the electronic device 101 while displaying the proceeding scenario on the display of the electronic device 102.

According to various embodiments, the scene displayed on the display 150 of the electronic device 101 and/or the display of the electronic device 102 while the specific program proceeds is not limited the above description, and a scene corresponding to one of a scenario and an event may be displayed. Here, the terms "scenario" and "event" are distinguished from each other according to the meanings thereof, and may be defined as a general meaning of a scenario or event. In the various embodiments of the present disclosure, an event may be defined as an incident that occurs when a specific portion of a scenario proceeds. In addition, a scenario may represent the progress of an overall story, and an event may represent the progress of a portion of a scenario. Further, a scenario may represent a main story, and an event may represent a sub-story corresponding to a portion of a proceeding scenario. Although a scenario is defined as a super-ordinate concept to an event in the above description, the present disclosure is not limited thereto, and it is apparent that an event may be a super-ordinate concept to a scenario.

According to various embodiments, the electronic devices 101 and 102 may simultaneously proceed with a specific program that performs the same or a similar scenario, and may synchronize the progress time thereof. The electronic devices 101 and 102 may display, on the display 150 of the electronic device 101 and the display of the electronic device 102, scenes corresponding to respective progress time points in a specific program. For example, the scenes may be represented a sequence of images. In the following description, the display of the electronic device 102 may be referred to as a main display, and the display of the electronic device 101 may be referred to as a sub-display. According to various embodiments, a device (e.g., electronic device 103) that is the same as or similar to the electronic device 101 may be added to proceed with a specific program. In this case, the display 150 of the electronic device 101 may be referred to as a first sub-display, and a display of the electronic device 103 may be referred to as a second sub-display. In cases where at least one electronic device displays a scene of a specific event on each display, a scene displayed on the main display may be referred to as a main scene and a scene displayed on the sub-display may be referred to as a sub-scene. In cases where two or more sub-displays exist, the sub-scene may be referred to as a first or second sub-scene.

According to various embodiments, the electronic device 101 may control the progress of a scene displayed on the display of the electronic device 102 by controlling a scene displayed on the display 150 and/or by controlling a movement of the electronic device, such as the direction, the speed, etc.

Additional information on the electronic device 101 may be provided through FIGS. 2 to 13 which will be described below.

Figure 2:
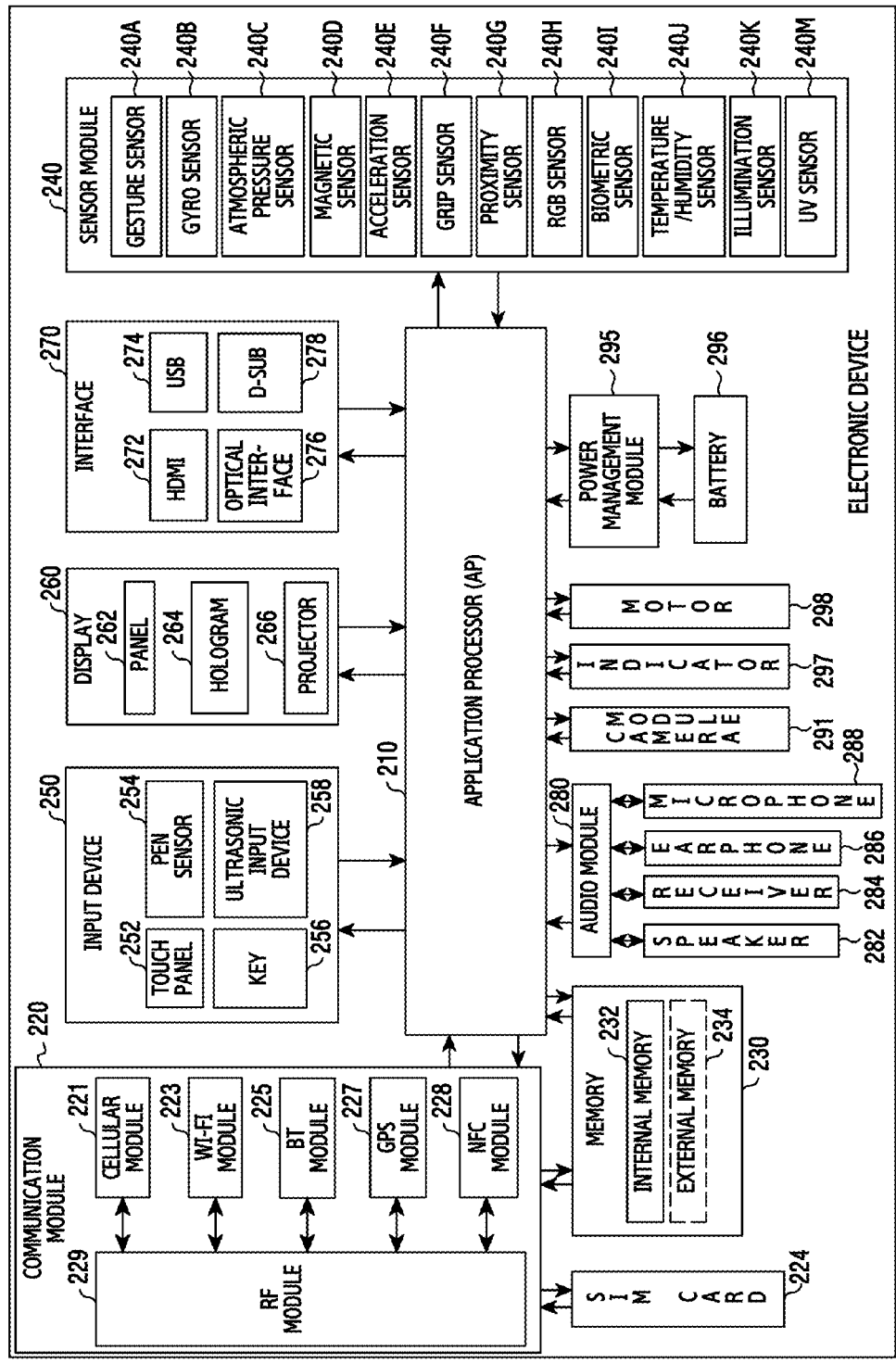
FIG. 2 is a block diagram of an electronic device according to various embodiments of the present disclosure.

FIG. 2 is a block diagram of an example of an electronic device, according to various embodiments of the present disclosure.

The electronic device 201 may include, for example, the entirety or a part of the electronic device 101 illustrated in FIG. 1, or may expand all or some elements of the electronic device 101. Referring to FIG. 2, the electronic device 201 may include at least one processor 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

At least one processor 210 may be included in the electronic device 101 to perform a specified function of the electronic device 101. According to an embodiment, the processor 210 may include one or more application processors (APs) and one or more microcontroller units (MCUs). According to another embodiment, the processor 210 may include one or more microcontroller units as applications, or may be functionally connected to one or more microcontroller units. In FIG. 2, the APs and the MCUs may be included in one IC package, or may be separately configured to be included in different IC packages, respectively. According to an embodiment, the MCUs may be included in an IC package of the APs to be configured as one IC package together with the APs. Although the processor 210 is illustrated as including the APs or the MCUs as elements thereof, it is nothing more than an embodiment for clear understanding, and it is apparent that the processor 210 may also perform the operations of the APs and/or the MCUs.

The APs may control a plurality of hardware or software elements connected thereto and perform processing and operations on various types of data including multimedia data by driving an operating system or application programs (or applications). The APs may be embodied as, for example, a System on Chip (SoC). According to an embodiment, the processor 210 may further include a graphic processing unit (GPU, not illustrated).

The MCUs may be processors configured to perform specified operations. According to an embodiment, the MCUs may acquire sensing information through one or more specified motion sensors (e.g., a gyro sensor 240B, an acceleration sensor 240E, or a geomagnetic sensor (not illustrated)), compare the acquired sensing information, and determine the respective operating states of the specified sensors (e.g., a geomagnetic sensor) with reference to a database of the electronic device 201. In addition, although the MCUs and the elements of the sensor module 240 are illustrated as separate elements in FIG. 2, the MCUs may be implemented to include at least some elements of the aforementioned sensor module 240 (e.g., at least one of the gyro sensor 240B, the acceleration sensor 240E, and the geomagnetic sensor) according to an embodiment.

According to an embodiment, the APs or the MCUs may load instructions or data received from at least one of non-volatile memories or other elements connected thereto in volatile memories, and may process the loaded instructions or data. Furthermore, the APs or the MCUs may store data received from or generated by at least one of the other elements in non-volatile memories.

The communication module 220 (e.g., the communication interface 160) may perform data transmission/reception in communication between the electronic device 101 and other electronic devices (e.g., the electronic device 102 or 104, or the server 106) connected thereto through a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide a voice call service, a video call service, a text message service, or an Internet service through a communication network (e.g., Long Term Evolution (LTE), LTE-A, Code Division Multiple Access (CDMA), Wideband CDMA (WCDMA), Universal Mobile Telecommunication System (UMTS), Wireless Broadband (WiBro), or Global System for Mobile communication (GSM)). Furthermore, the cellular module 221 may, for example, distinguish between and authenticate electronic devices within a communication network using a subscriber identification module (e.g., the SIM card 224). According to an embodiment, the cellular module 221 may perform at least some of the functions that the AP 210 may provide. For example, the cellular module 221 may perform at least some of the multimedia control functions.

According to an embodiment of the present disclosure, the cellular module 221 may include a communication processor (CP). Furthermore, the cellular module 221 may be embodied as, for example, an SoC. Although the elements such as the cellular module 221 (e.g., a communication processor), the memory 230, and the power management module 295 are illustrated to be separate from the AP 210 in FIG. 2, the AP 210 may be implemented to include at least some of the aforementioned elements (e.g., the cellular module 221) according to an embodiment.

According to an embodiment, the AP 210 or the cellular module 221 (e.g., the communication processor) may load instructions or data received from at least one of non-volatile memories or other elements connected thereto in volatile memories, and may process the loaded instructions or data. Furthermore, the AP 210 or the cellular module 221 may store data received from or generated by at least one of the other elements in a non-volatile memory.

The Wi-Fi module 223, the BT module 225, the GPS module 227, and the NFC module 228 may include a processor for processing data transmitted/received through the corresponding module. In FIG. 2, the cellular module 221, the Wi-Fi module 223, the BT module 225, the GPS module 227, and the NFC module 228 are illustrated as separate blocks. However, according to an embodiment, at least some (e.g., two or more) of the cellular module 221, the Wi-Fi module 223, the BT module 225, the GPS module 227, and the NFC module 228 may be included in one integrated chip (IC) or one IC package. For example, at least some of the processors corresponding to the cellular module 221, the Wi-Fi module 223, the BT module 225, the GPS module 227, and the NFC module 228 (e.g., a communication processor corresponding to the cellular module 221 and a Wi-Fi processor corresponding to the Wi-Fi module 223) may be implemented as one SoC.

The RF module 229 may transmit/receive data, for example, RF signals. Although not illustrated, the RF module 229 may, for example, include a transceiver, a power amp module (PAM), a frequency filter, a low noise amplifier (LNA), or the like. In addition, the RF module 229 may further include an element for transmitting/receiving electronic waves over free air space in wireless communication, such as, a conductor, a conducting wire, or the like. In FIG. 2, the cellular module 221, the Wi-Fi module 223, the BT module 225, the GPS module 227, and the NFC module 228 share one RF module 229. However, according to an embodiment, at least one of them may transmit/receive an RF signal through a separate RF module.

The SIM card 224 may be a card that includes a subscriber identification module, and may be inserted into a slot formed in a specific location of the electronic device. The SIM card 224 may include unique identification information (e.g., an integrated circuit card identifier (ICCID)) or subscriber information (e.g., an international mobile subscriber identity (IMSI)).

The memory 230 (e.g., the memory 130) may include an internal memory 232 or an external memory 234. The internal memory 232 may include at least one of, for example, a volatile memory (e.g., a dynamic random access memory (DRAM), a static RAM (SRAM), a synchronous dynamic RAM (SDRAM), or the like) or a non-volatile memory (e.g., a One Time Programmable Read Only Memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like).

According to an embodiment, the internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), a Memory Stick, or the like. The external memory 234 may be functionally connected to the electronic device 201 through various interfaces. According to an embodiment, the electronic device 201 may further include a storage device (or storage medium) such as a hard disc drive.

The sensor module 240 may measure a physical quantity or sense the operating state of the electronic device 201 and convert the measured or sensed information into an electric signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an infrared (IR) sensor (not illustrated), an iris sensor (not illustrated), a fingerprint sensor (not illustrated), and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may detect a touch input using at least one of, for example, a capacitive type, a resistive type, an infrared type, and an acoustic wave type. Furthermore, the touch panel 252 may further include a control circuit. In the case of the capacitive type touch panel, physical contact or proximity detection is possible. The touch panel 252 may further include a tactile layer. In this case, the touch panel 252 may provide a user with a tactile reaction.

The (digital) pen sensor 254 may be implemented, for example, using the same or a similar method to receiving a user's touch input, or using a separate sheet for detection. The key 256 may include, for example, a physical button, an optical key, or a keypad. The ultrasonic input device 258 may identify data by sensing acoustic waves with the microphone (e.g., a microphone 288) of the electronic device 201 through an input unit used for generating ultrasonic signals and may perform a wireless detection. According to an embodiment, the electronic device 201 may also receive a user input from an external device (e.g., a computer or server) connected thereto using the communication module 220.

The display 260 (e.g., the display 150) may include a panel 262, a hologram device 264, or a projector 266. The panel 262 may be, for example, a liquid crystal display (LCD), an active matrix organic light emitting diode (AM-OLED), or the like. The panel 262 may be implemented to be, for example, flexible, transparent, or wearable. The panel 262 may also be formed as a single module together with the touch panel 252. The hologram device 264 may show a three-dimensional image in the air by using interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bilaterally convert a sound and an electric signal. At least some elements of the audio module 280 may be included in, for example, the input/output interface 140 illustrated in FIG. 1. The audio module 280 may process voice information input or output through, for example, a speaker 282, a receiver 284, earphones 286, or the microphone 288.

The camera module 291, which is a device for capturing both still and moving images, may include one or more image sensors (e.g., a front sensor or a rear sensor), a lens (not illustrated), an image signal processor (ISP, not illustrated), or a flash (e.g., an LED or a xenon lamp, not illustrated) according to an embodiment.

The power management module 295 may manage the power of the electronic device 201. Although not illustrated, the power management module 295 may include, for example, a power management integrated circuit (PMIC), a charger integrated circuit (IC), or a battery or fuel gauge. According to various embodiments, the PMIC may be mounted in an integrated circuit or an SoC semiconductor. Charging methods may be classified into wired charging and wireless charging. The charger IC may charge a battery and may prevent an overvoltage or excess current from being introduced from a charger.

According to an embodiment, the charger IC may include a charger IC for at least one of the wired charging and the wireless charging. Examples of the wireless charging may include magnetic resonance charging, magnetic induction charging, and electromagnetic charging, and an additional circuit for wireless charging, for example, a coil loop, a resonance circuit, a rectifier or the like may be added.

The battery gauge may measure, for example, a residual quantity of the battery 296, and a voltage, a current, or a temperature while charging. The battery 296 may store or generate electricity and supply power to the electronic device 201 using the stored or generated electricity. The battery 296 may include, for example, a rechargeable battery or a solar battery.

The indicator 297 may indicate a specific state of the electronic device 201 or a part thereof (e.g., the AP 210), for example, a boot-up state, a message state, or a state of charge (SOC). A motor 298 may convert an electric signal into a mechanical vibration. Although not illustrated, the electronic device 201 may include a processing device (e.g., a GPU) for mobile TV support. The processing unit for mobile TV support may process, for example, media data pursuant to a certain standard of Digital Multimedia Broadcasting (DMB), Digital Video Broadcasting (DVB), or media flow.

Each of the above-described elements of the electronic device according to various embodiments of the present disclosure may include one or more components, and the name of a corresponding element may vary according to the type of electronic device. The electronic device according to various embodiments of the present disclosure may include at least one of the above-described elements and may exclude some of the elements or further include other additional elements. Further, some of the elements of the electronic device according to various embodiments of the present disclosure may be coupled to form a single entity while performing the same functions as those of the corresponding elements before the coupling.

A multi-screen service means a service by which information and content can be seamlessly shared in a convenient manner by using electronic devices (e.g., a television, a portable terminal, a tablet PC, a computer, a vehicle, etc.) that can be connected through a network. The multi-screen service function may be classified into a function of sharing and synchronizing content and a remote control function. The function of sharing and synchronizing content may be a function of identically displaying a multi-screen by a plurality of electronic devices or displaying a sub-screen with which a part of a multi-screen is synchronized. The synchronization function may mean a function of controlling an electronic device that provides a multi-screen service by another electronic device.

It is assumed that a plurality of electronic devices, according to various embodiments, have different displays. For example, an electronic device that executes a multi-screen service may be a first electronic device (hereinafter, referred to as an electronic device 102), for example a television, which has a relatively large display, and an electronic device that displays a sub-screen of the electronic device which executes the multi-screen service may be a second electronic device (hereinafter, referred to as an electronic device 101 or an electronic device 103), for example a portable terminal, a mobile phone, etc., which has a relatively small display.

According to various embodiments, the electronic device 101 may display a screen synchronized with a partial area of a display of the electronic device 102, which executes a multi-screen service, as a sub-screen. For example, the electronic device 101 may display a sub-screen synchronized with a screen that is partially displayed on the display of the electronic device 102 and may adjust the display size of the sub-screen by performing a zoom-in/zoom-out function. Further, the electronic device 101 may display a sub-scene synchronized with a scene that is partially displayed on the display of the electronic device 102 and may modify the display state of a main scene by controlling the change of display information of a scene (e.g., contrast, color, luminance, etc. of a scene).

According to various embodiments, the electronic device 101 may display a sub-scene for providing an effect of a set function on a screen synchronized with a partial area of the display of the electronic device 102 that executes a multi-screen service. In the following various embodiments, a multi-screen service may be assumed to be a multi-screen game.

Figure 3:
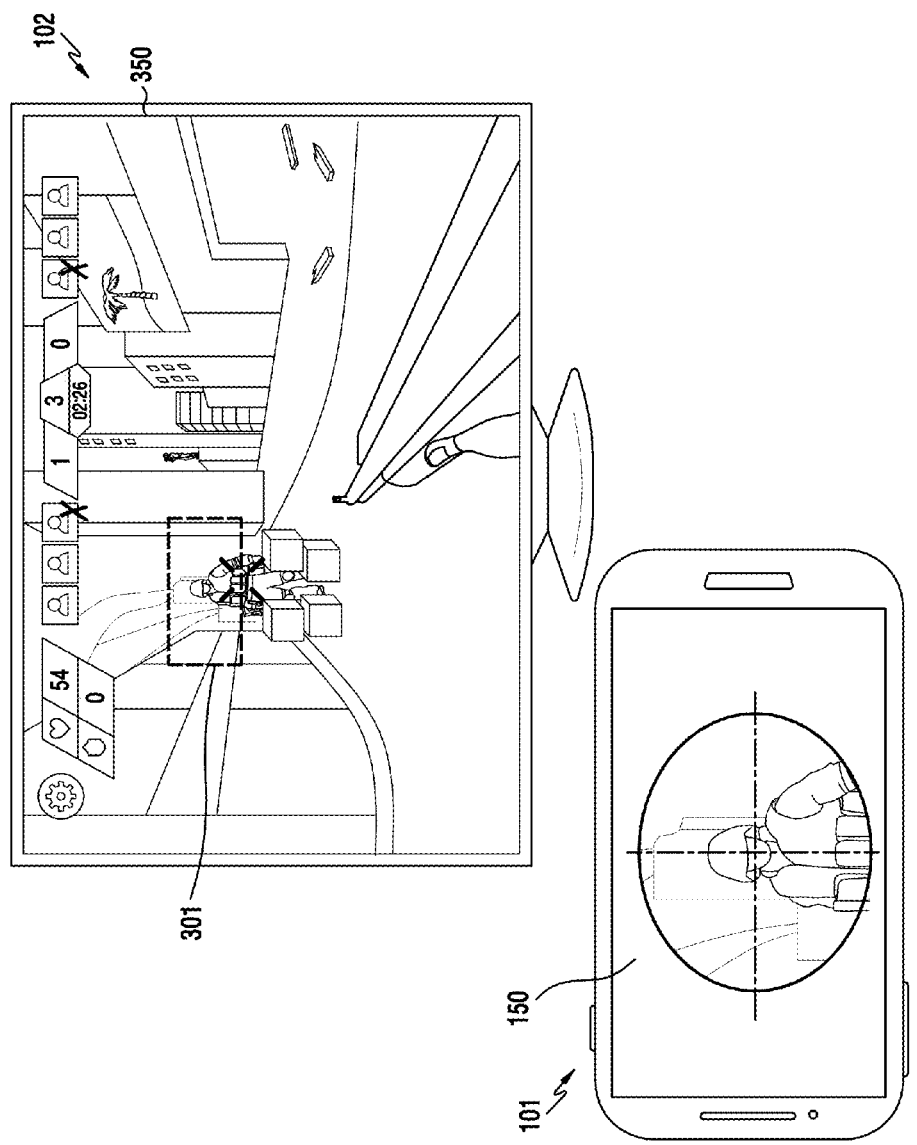
FIG. 3 illustrates an operation of displaying an event of a specific program in an electronic device according to various embodiments.

FIG. 3 illustrates an operation of displaying an event of a specific program in an electronic device according to various embodiments.

According to the various embodiments, an electronic device 101 may display a scene of a part (e.g., a second event) of a first event that is proceeding in an electronic device 102. According to an embodiment, the electronic device 101 may display, on a display 150 thereof, a viewpoint of a device (e.g., a telescopic weapon sight, a telescope, a front weapon sight, etc.) for zooming in or out on a part (e.g., a region 301) of a scene that is being displayed on a display 350 of the electronic device 102. For example, the electronic devices 101 and 102, while simultaneously proceeding with a strategic simulation game, may display a first person viewpoint scene of a rifleman (e.g., a player avatar or character) on the display 350 of the electronic device 102. While the first person viewpoint scene is displayed on the display 350, the electronic device 101 may identify a user input for zooming in on a part of the scene displayed on the display 350. The electronic device 101 may display, on the display 150 thereof, a zoomed-in view of a specified location (e.g., the region 301) in the first person viewpoint scene displayed on the display 350. Here, when determining a location where the electronic device 101 zooms in (e.g., a part that is selected for zoom-in from the first person viewpoint scene displayed on the display 350), the electronic device 101 may zoom in on a specific location (e.g., the region 301) within in a range specified based on a specific location) in response to an event occurring therein. Alternatively, the electronic device 101 may determine a location to zoom in on in the first person viewpoint scene displayed on the display 350 based on the electronic device 101 and may zoom in on the region 301 corresponding to the determined location. Here, the zoom degree is determined by a user or predetermined by the electronic device 101.

According to various embodiments, when the electronic device 101 displays, on the display 150 thereof, a scene corresponding to an event that is proceeding as a specific program (e.g., a game application, such as a strategic simulation program), the electronic device 101 may be configured as various devices without being limited to displaying a scene while operating as a device for zooming in or out on a part of a scene displayed on the display 350 of the electronic device 102. According to an embodiment, when the electronic device 101 displays, on the display 150 thereof, a part of a scene displayed on the display 350, the electronic device 101 may be used as various devices, such as an infrared inspection device (e.g., infrared weapon scope), a device for showing a region hidden by an object from a first person viewpoint (e.g., a player's viewpoint), and a device for displaying what is not viewed from a player's viewpoint. According to various embodiments, when the electronic device 101 displays, on the display 150 thereof, a scene corresponding to an event (e.g., the second event) that proceeds as a specific program (e.g., a strategic simulation program), the electronic device 101 may independently display events that are proceeding in the electronic devices 101 and 102 for the specific program without being limited to displaying a part of an event (e.g., the first event) that is being displayed on the display 350 of the electronic device 102. According to an embodiment, when proceeding with a specific program, the electronic device 102 may display, on the display 350 thereof, a scene that is proceeding in a third person viewpoint. The electronic device 101, when proceeding with a specific program, may display, on the display 150 thereof, a scene that is proceeding in a first person viewpoint of a player that makes a control through the electronic device 101.

Figure 4:
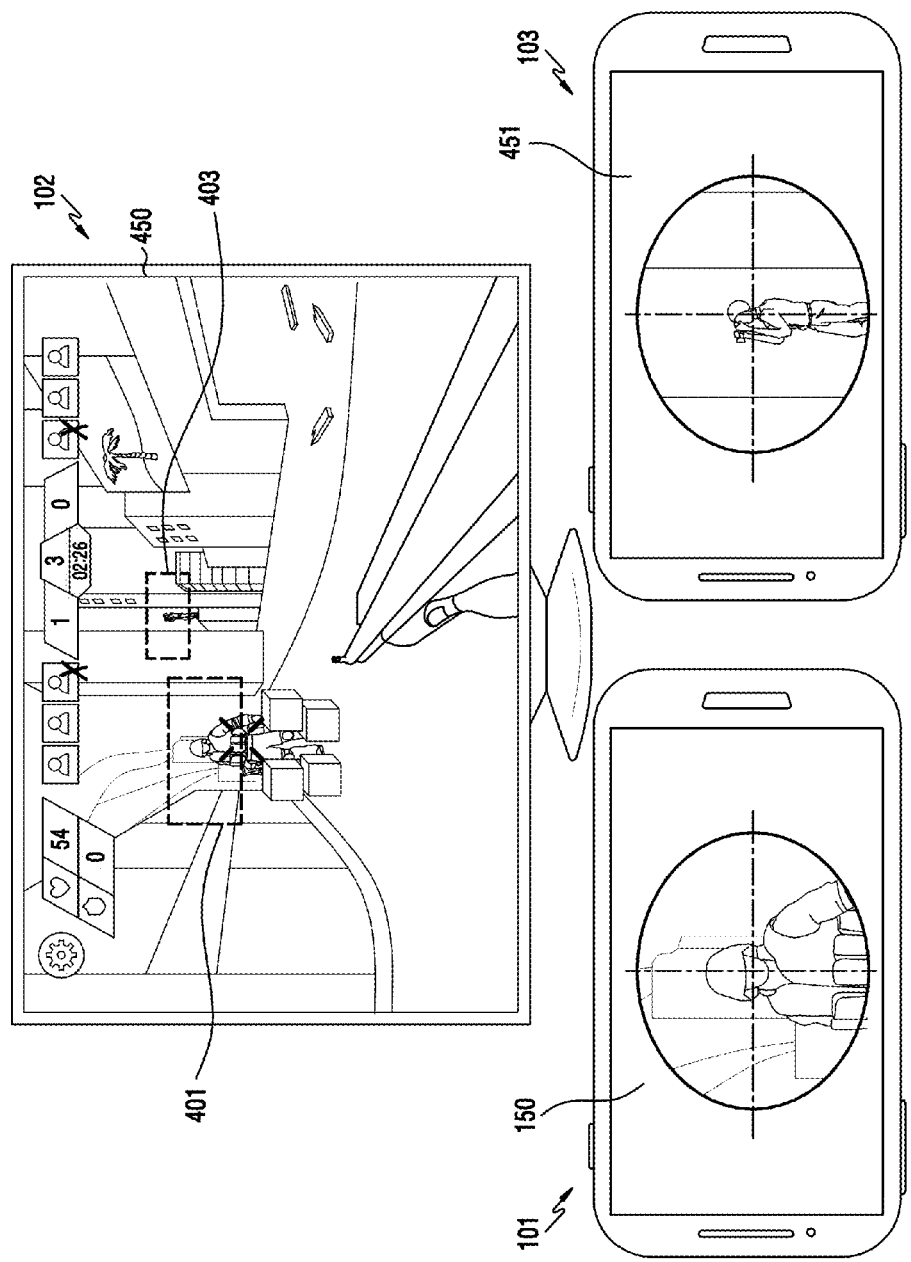
FIG. 4 illustrates an operation of displaying a specified scene on a sub-display of an electronic device according to various embodiments.

FIG. 4 illustrates an operation of displaying a specified scene on a sub-display of an electronic device according to various embodiments.

According to various embodiments, an electronic device 101, an electronic device 102, and an electronic device 103 may proceed with a specific program. The electronic device 102 may display the main scene of the specific program on a display 450 thereof. The electronic device 101 may display a first sub-scene of the specific program on a display 150 thereof. The electronic device 103 may display a second sub-scene of the specific program on a display 451 thereof.

According to an embodiment, an electronic device 101, an electronic device 102, and an electronic device 103 may proceed with a specific program, such as a game. The electronic device 102 may display the main scene (e.g., a scene configured in a third person viewpoint) of a proceeding event on the display 450 thereof. The electronic devices 101 and 103 may function as a sub-display of the main display (e.g., the display 450) of the electronic device 102. According to an embodiment, the electronic devices 101 and 102 may be specified as a control device for controlling a specified player in a specific program. Alternatively, the electronic devices 101 and 102 may be specified as a device (e.g., virtual in-game equipment such as a sword, a gun, etc.) carried by a player. For example, the electronic device 101 may be specified as a rifle carried by a first player. The electronic device 103 may be specified as a rifle carried by a second player. The electronic device 101 and/or the electronic device 103 may perform a function specified thereto according to the specified weapon-type based on a user input. For example, the electronic device 101 may perform a zoom-in function simulating a telescopic sight mounted on a rifle, based on a user input. The electronic device 103 may simulate a zoom function with a telescopic sight mounted on a rifle based on a user input. Here, the respective devices (e.g., the electronic device 101 and the electronic device 103) may independently, respective of one another, determine and/or display scenes during zoom in on the first sub-display 150 of the electronic device 101 and on the second sub-display 451 of the electronic device 103. That is, they each display different zoom-in screens according to orientation of the respective virtual in-game weapons represented by device 101 and 103. Alternatively, the respective devices (e.g., the electronic device 101 and the electronic device 103) may determine to display specified scenes based on the progress of a specific program. In cases where the electronic devices 101 and 103 independently determine the scenes that are to be displayed on the sub-displays, respectively, the electronic device 101 and/or the electronic device 103 may determine a zoom-in region corresponding to a specified location in the scene that is to be displayed on the main display of the electronic device 103. The electronic device 101 and/or the electronic device 103 may display the determined zoom-in region on the sub-displays thereof. For example, the electronic device 101 may zoom in on a region 401 in the scene (e.g., the main scene) displayed on the main display 450 of the electronic device 102 and may display the zoomed-in region as a first sub-scene. The electronic device 103 may zoom in on a region 403 in the scene (e.g., the main scene) displayed on the main display 450 of the electronic device 102 and may display the zoomed-in region as a second sub-scene. The electronic device 101 and/or the electronic device 103 may independently perform a corresponding event based on the scene displayed on the sub-display thereof.

According to various embodiments, at least one of the electronic devices 101, 102, and 103 may synchronize data corresponding to an operation performed through a specific program. According to an embodiment, in response to a main event with which the electronic device 102 proceeds, the electronic devices 101 and 103 may proceed with independent sub-events corresponding to the progress time point. The electronic device 101 and/or the electronic device 103 may perform synchronization on the progress of the main event and/or the sub-events along with the electronic device 102 at least one time point among a time point to start the independent sub-events, a time point to complete the independent sub-events, and a time point when the independent sub-events are proceeding.

Figure 5:
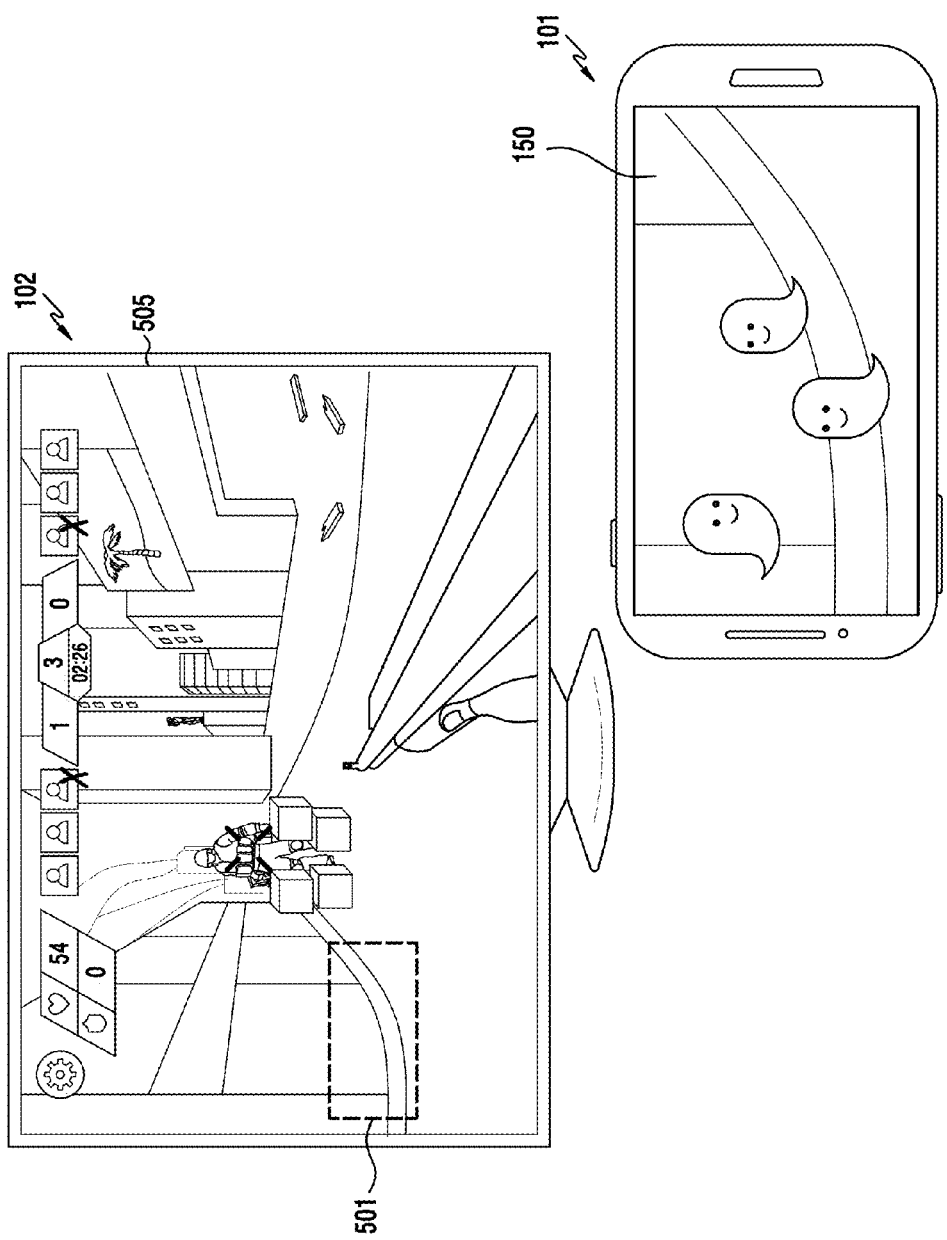
FIG. 5 illustrates an operation of displaying a specified scene on a display of an electronic device according to various embodiments.

FIG. 5 illustrates an operation of displaying a specified scene on a display of an electronic device according to various embodiments.

According to the various embodiments, an electronic device 101, when executing a specific program (e.g., a game program), may apply a specific effect to a scene displayed on a display 505 of an electronic device 102 and may display the same. According to an embodiment, when the electronic device 101 determines to display, on a display 150 thereof, a specific region 501 in the scene displayed on the display 505 of the electronic device 102, the electronic device 101 may operate to allow a hidden effect in the scene displayed on the display 505 of the electronic device 102 to be displayed through the display 150 of the electronic device 101. According to an embodiment, the electronic device 101 may function as a filter that allows a hidden object located in the specified region 501 of the scene displayed on the display 505 of the electronic device 102 to be visually displayed like the scene displayed on the display 150.

According to various embodiments, the electronic device 101 may be used as a device that performs a function of applying various effects, such as seeing through a specific object in the scene displayed on the display 505 of the electronic device 102, showing the rear of a specific object in the scene displayed on the display 505, etc., and a function of displaying an unrealistic scene.

Figure 6:
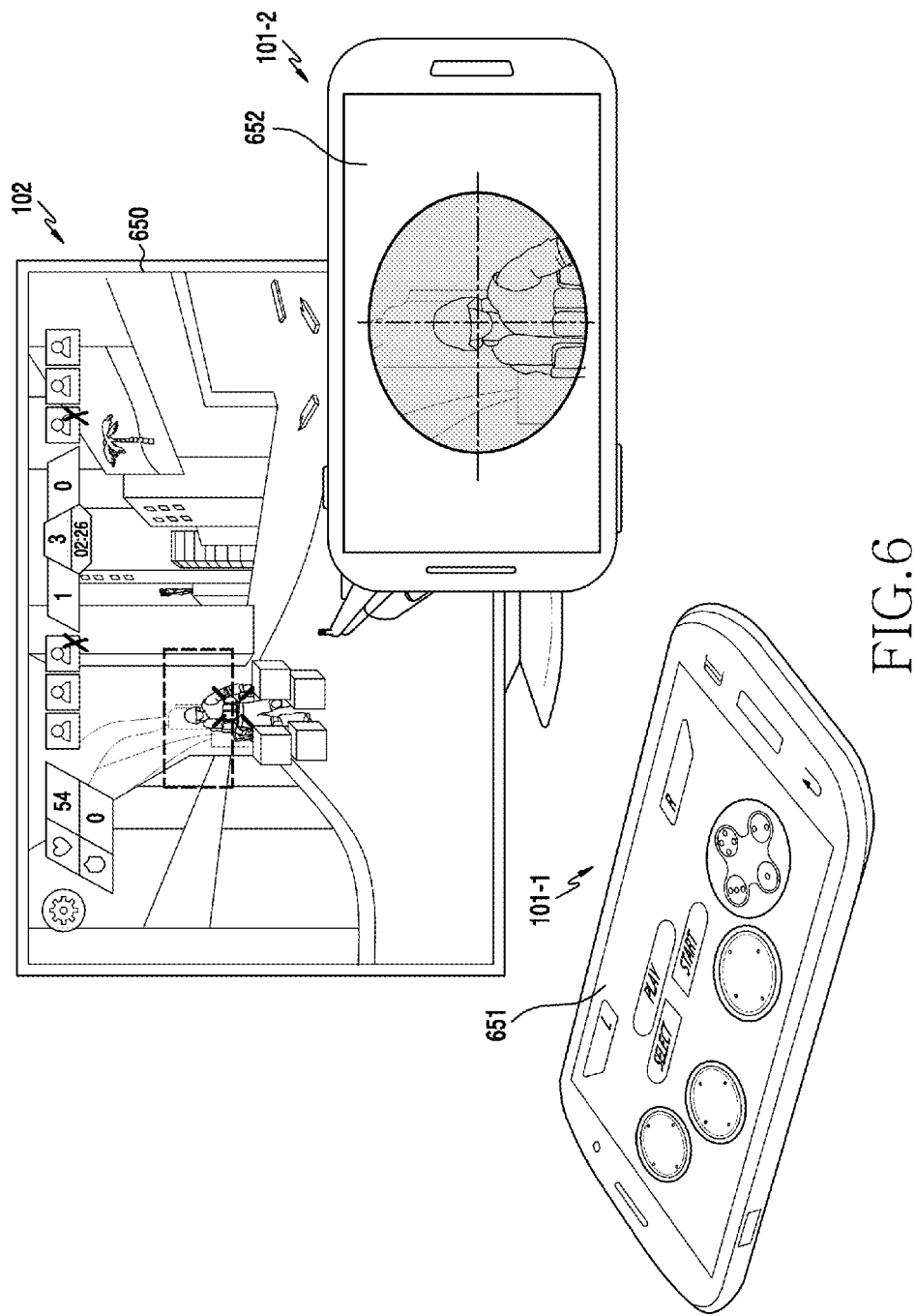
FIG. 6 illustrates an operation of displaying a specified scene on a display in response to the direction of an electronic device according to various embodiments.

FIG. 6 illustrates an operation of displaying a specified scene on a display in response to the direction of an electronic device according to various embodiments.

According to the various embodiments, an electronic device 101 may display, on a display 150 thereof, two or more scenes in response to the progress of an event that proceeds in a specific program. According to an embodiment, the electronic device 101 may display, on the display 150 thereof, a scene corresponding to an event that is proceeding through an electronic device 102 and/or the electronic device 101. The electronic device 101 may display, on the display 150 thereof, a scene corresponding to a controller that controls the progress of a scene displayed on the electronic device 102. The electronic device 101 may detect a user input through the display on which a scene corresponding to a proceeding event is displayed. The electronic device 101 may perform an operation corresponding to the user input through the electronic device 101 and/or the electronic device 102.

According to an embodiment, an electronic device 101-1 may page a controller for a display 651 thereof in order to control a scene displayed on a display 650 of the electronic device 102. The electronic device 101-1 may function as a controller that controls a scene displayed on the display 650 of the electronic device 102. According to an embodiment, the electronic device 101-1 may detect a user input based on the controller displayed on the display 651 thereof. Further, in the progress of a specific program, the electronic device 101-1 may control the progress of a scene displayed on the display 650 of the electronic device 102, or may control a player.

According to an embodiment, an electronic device 101-2 may display, on a display 652 thereof, a part of a scene displayed on the display 650 of the electronic device 102 or another related scene (e.g., a scene to which an effect, such as zoom-in/zoom-out, an infrared filter, clairvoyance, etc., is applied). The electronic device 101-2 may detect a user input through the display 652 based on the scene displayed on the display 652 thereof. The electronic device 101-2 may control the progress of the scene displayed on the display 652 of the electronic device 101-2 and the scene displayed on the display 650 of the electronic device 102 based on the detected user input. If an object included in the display 652 of the electronic device 101-2 is selected by a user input, the electronic device 101-2 may generate information indicating the selection of the object, and may transmit the information to the electronic device 102. And, the electronic device 102 may receive the information, and may change the scene to new scene based on the information.

According to various embodiments, the electronic device 101 may display, on the display 150 thereof, at least one of two or more scenes (e.g., a scene of a proceeding event and/or a scene of a controller) based on a user input or the progress of a specific program. According to an embodiment, the electronic device 101 may determine a scene to be displayed on the display 150 thereof through at least one sensor that may acquire situation information on the electronic device 101 and/or the vicinity of the electronic device 101. For example, the electronic device 101 may display a scene of a controller as displayed on the display 651 of the electronic device 101-1 when the surface of the display 150 of the electronic device 101 (or the front side of the electronic device 101) is located in a parallel (or horizontal) direction to the ground through at least one of sensors, such as a gyroscope, an acceleration sensor, and a tilt sensor, which detects a motion of the electronic device 101, such as a direction, rotation, a speed, and acceleration. The electronic device 101 may display a scene of a specific proceeding event (e.g., a scene of an infrared filter) as displayed on the display 652 of the electronic device 101-2 when the surface of the display 150 of the electronic device 101 is located in a perpendicular (vertical) direction to the ground through at least one of the sensors. The electronic device 101, without being limited thereto, may determine a scene to be displayed on the display 150 thereof through various sensors included therein. According to an embodiment, the electronic device 101 may display a specified scene on the display 150 thereof to correspond to a case where it is determined through a camera on the rear surface of the electronic device 101 that a specified region of the display 650 of the electronic device 102 is included in an angle of view (e.g., angle) of the camera, or a case where the specified region of the display 650 is not included therein.

FIG. 7 illustrates an operation of displaying a specified scene on a display of an electronic device according to various embodiments.

According to the various embodiments, when proceeding with a specific program (e.g., a simulation program), an electronic device 101 may display, on a display 150 thereof, a scene corresponding to a function (e.g., a controller) of a specific object (e.g., a ship) that is included in a scene displayed on a display 750 of an electronic device 102. According to an embodiment, the electronic device 101 and the electronic device 102 may simultaneously proceed with the specific program. For example, the electronic device 101 may establish a communication with the electronic device 102, and may simultaneously proceed with the specific program.

The electronic device 102 may display a scene of a proceeding event on the display 750 thereof. For example, the electronic device 101 may identify a specific event in which a ship appears during the progress of the specific program through the electronic device 102. The electronic device 102 may display at least a part of the ship on the display 750 thereof. The electronic device 101 may display a scene of a controller that controls the ship. The electronic device 101 may control an operation of the controller displayed on the display 150 based on a user input.

According to an embodiment, the electronic device 101 may control the operation of the controller displayed on the display 150 through a movement of the electronic device 101 acquired based on a sensor included in a sensor unit 170 of the electronic device 101 (e.g., a sensor having a connection relation with at least two sensors, although physically included in the sensor unit). For example, the electronic device 101 may acquire situation information thereof, such as a direction, rotation, a speed, and acceleration, which is acquired through at least one sensor, and may identify a rotation 751 thereof. In response to the rotation 751 detected through the sensor, the electronic device 101 may display a scene in which the controller displayed on the display 150 is rotated leftwards. Likewise, the electronic device 101, when determining rotation 753 thereof through a sensor, may display a scene in which the controller displayed on the display 150 is rotated rightwards.

Without being limited to the scenes in which the controller displayed on the display 150 is moved, the electronic device 101 may execute various operations corresponding to an input identified based on a user input detected through the display 150, and may transmit data on the executed operations to the electronic device 102. And, the electronic device 102 may receive the date and may display a changed scene based on the data. For example, if the data is data with respect to the rotation 751 of the electronic device 101, the electronic device 102 may display a scene that the ship in the display 750 is rotated leftwards. In addition, when displaying, on the display 150, a scene of an event that proceeds in a specific program (e.g., a strategic simulation program), the electronic device 101 may display a scene of a specific function (e.g., a controller) that may be used in the corresponding event as described above, and may also display a controller that controls an object (e.g., a ship) of a scene displayed on the display 750 of the electronic device 102.

Figure 8:
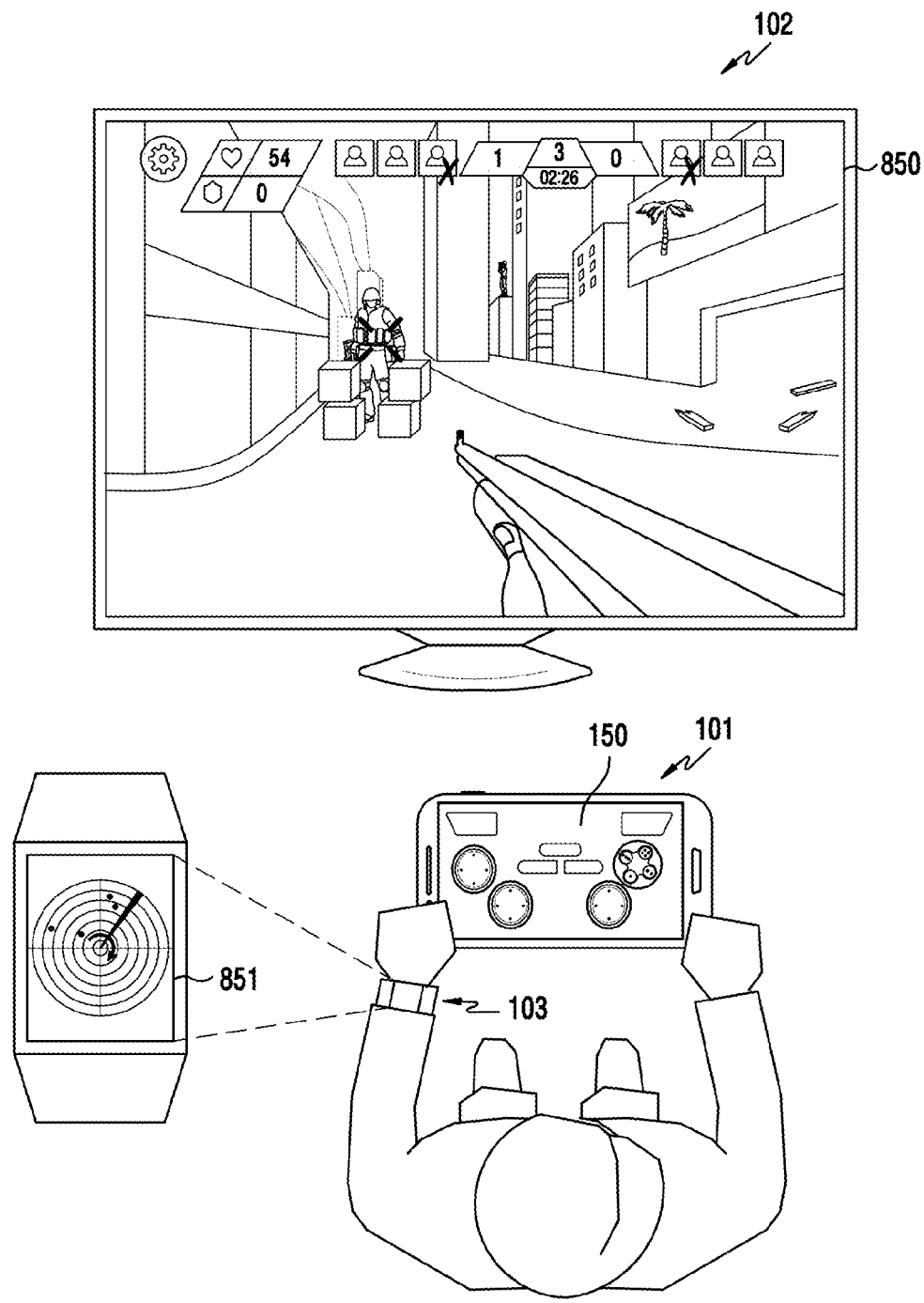
FIG. 8 illustrates an operation of displaying a specified scene on a sub-display of an electronic device according to various embodiments.

FIG. 8 illustrates an operation of displaying a specified scene on a sub-display of an electronic device according to various embodiments.

According to the various embodiments, an electronic device 101 may synchronize data corresponding to an event of a specific proceeding program with at least two electronic devices (e.g., an electronic device 102 and/or an electronic device 103). According to an embodiment, in a state where the electronic device 102 is specified as a main console to proceed with a specific program, the electronic device 102 may simultaneously proceed with a scenario of the specific program together with at least one electronic device (e.g., the electronic device 101 or 103). Here, the electronic device 101 may be a smart phone, and the electronic device 103 may be a wearable device (e.g., a smart watch) that can be worn on a user's body part.

According to various embodiments, the electronic device 101 may display a scene of a proceeding event on a display 150 thereof while being synchronized with the electronic device 102 and/or the electronic device 103 based on data of a specific program included in a memory 130. In addition, the electronic device 101 may control a scene displayed on the display 150 thereof based on an input, such as a user input detected through the display 150 which displays the scene or a movement of the electronic device 101 (a movement acquired through at least one sensor). The electronic device 101 may synchronize data on a proceeding event with the electronic device 102 and/or the electronic device 103 based on a user input, and the electronic device 102 and/or the electronic device 103 which receives the data from the electronic device 101 may control the progress of the corresponding event of a specific program based on the received data.

According to various embodiments, a user may control a scene displayed on the display 150 of the electronic device 101 by identifying a scene displayed on a display 851 of the electronic device 103. The user may proceed with a scenario of the electronic device 102 operating as the main console by controlling the scene of the electronic device 101. The electronic device 101, the electronic device 102, and the electronic device 103 may display scenes of specified events therethrough. The electronic device 101, the electronic device 102, and the electronic device 103 may proceed with events corresponding to the currently displayed scenes based on detected inputs. The electronic device 101, the electronic device 102, and the electronic device 103, while being connected to each other through a network communication, may share (e.g., synchronize) data on events (e.g., data on the progress of events or log data) of a specific program that are performed in the respective electronic devices. The electronic device 101, the electronic device 102, and the electronic device 103 may proceed with the next relevant scenario by applying the received data to the progress state of the specific program.

According to various embodiments, the electronic device 102, when operating as a main console, may receive data on the progress of a corresponding event from the electronic device 101 and/or the electronic device 103 and may apply the received data to a specific program. The electronic device 102 may transmit progress information of the applied state to at least one other electronic device (e.g., the electronic device 101 or 103) that is specified to synchronize the specific program through a network communication.

According to various embodiments, although first and second sub-displays are included in independent electronic devices (e.g., the electronic device 102 and the electronic device 103), respectively, according to the embodiment of FIG. 4 and/or FIG. 5, the present disclosure is not limited thereto, and a single electronic device (e.g., the electronic device 101) may display two or more sub-displays.

Figure 9:
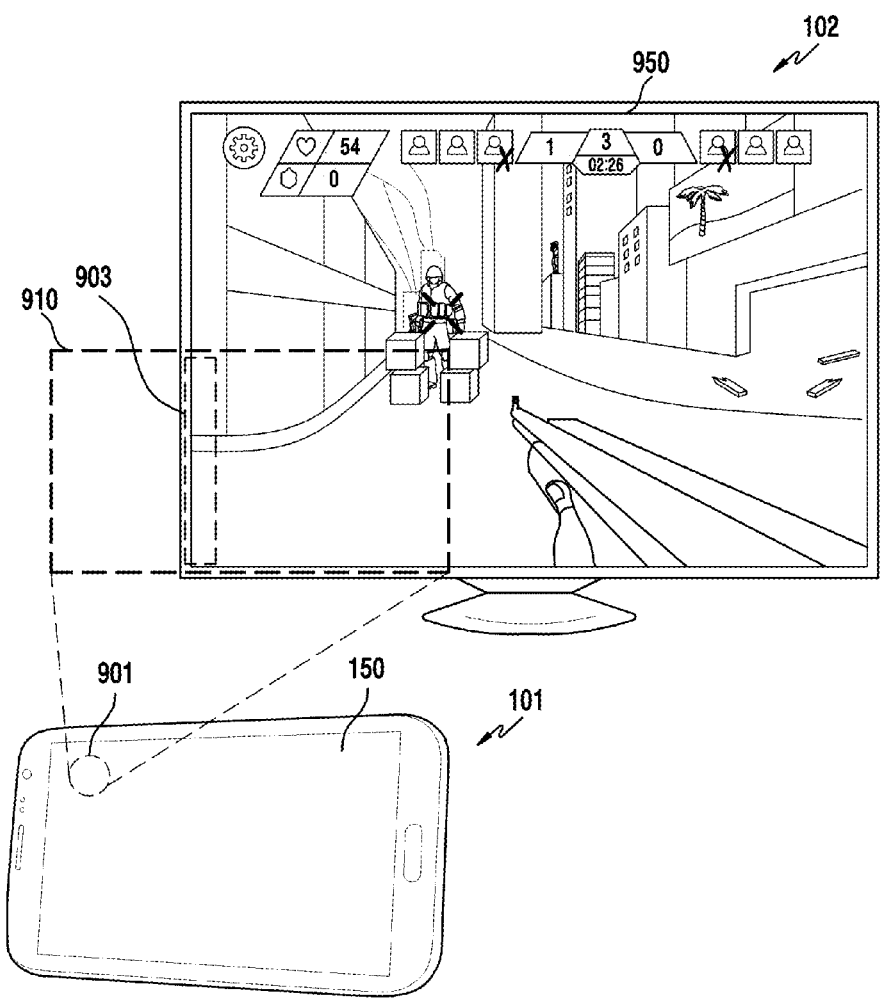
FIG. 9 illustrates an operation in which an electronic device synchronizes display coordinates with another electronic device according to various embodiments.

FIG. 9 illustrates an operation in which an electronic device synchronizes display coordinates with another electronic device according to various embodiments.

According to the various embodiments, an electronic device 101 may synchronize a location (or coordinates) displayed on a display 150 thereof with a location on a display 950 of an electronic device 102 that corresponds to a scene displayed on the display 150 of the electronic device 101. According to an embodiment, the electronic device 101 may include at least one camera, and may identify at least a part of the electronic device 102 and/or at least a part of a scene displayed on the display 950 of the electronic device 102 through the camera. The electronic device 101 may identify the periphery region of the display 950 in the electronic device 102 as a reference for synchronizing the location of a scene displayed on a display of each electronic device (e.g., the electronic device 102 or 103). For example, the electronic device 101, when acquiring a specific angle 910 through the camera, may identify a periphery region 903 of the display 950 of the electronic device 102. Based on the identified periphery region, the electronic device 101 may synchronize the angle identified by the camera thereof with the location of the scene displayed on the display 950 of the electronic device 102. According to various embodiments, when the electronic device 101 proceeds with an event of a specific program, the electronic device 101 may display, on the display 150 thereof, a part of a scene displayed on the display 950 of the electronic device 102 and control the same. For example, when the electronic device 101 displays a part of a scene displayed on the display 950 of the electronic device 102 as a scene to be displayed on the display 150, the electronic device 101 may control the scene displayed on the display 150 thereof according to an input detected through the electronic device 101.

According to an embodiment, the electronic device 101 may control a movement of a scene displayed on the display 150 thereof based on a specific program included in a memory of the electronic device 101. Further, the electronic device 101 may display a corresponding scene received from the electronic device 102 in response to an input detected thereby. For example, an event with respect to the displayed scene is inputted by a user, the electronic device 101 may detect an image(or images) or a scene regarding the event from the memory, and display the detected image or scene on the display 150.

Figure 10:
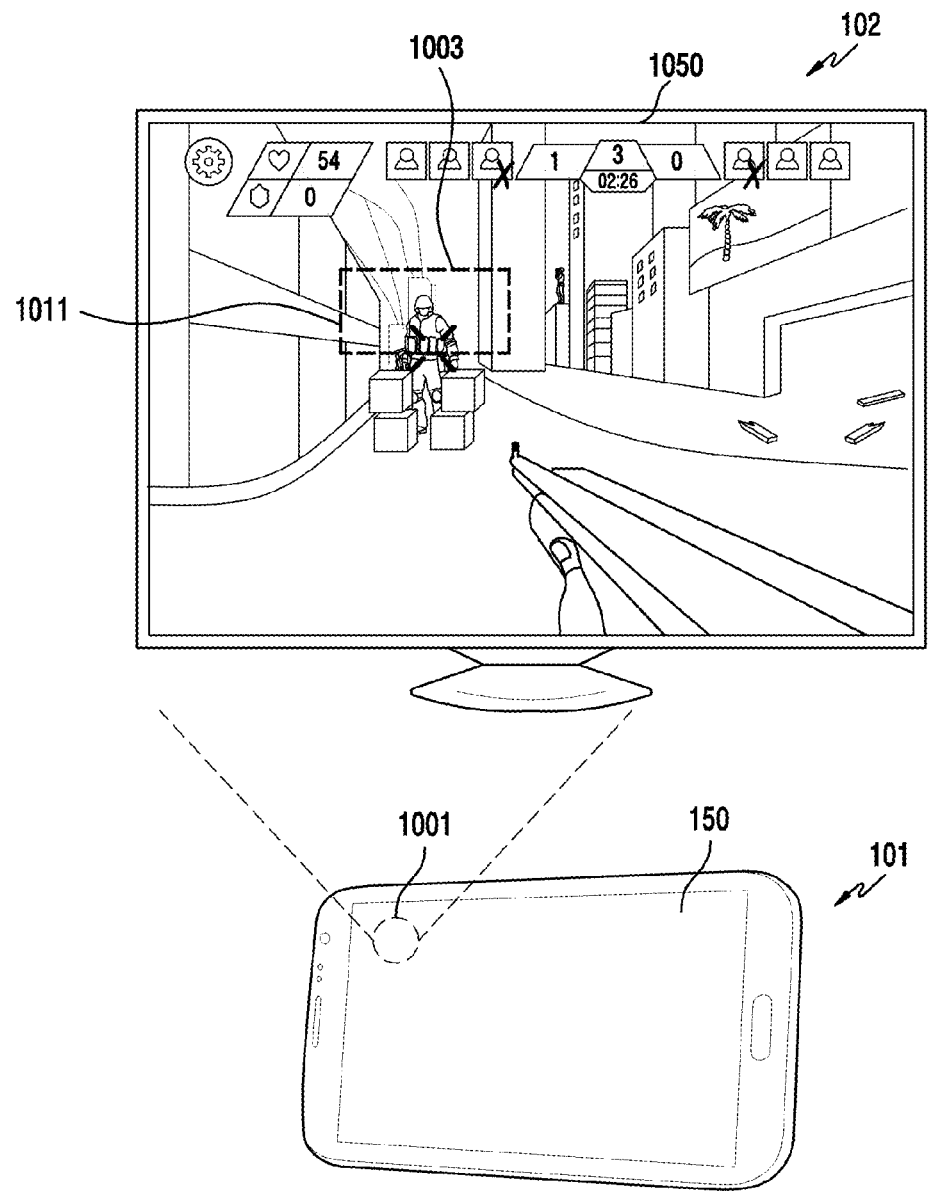
FIG. 10 illustrates an operation in which an electronic device synchronizes display coordinates with another electronic device according to various embodiments.

FIG. 10 illustrates an operation in which an electronic device synchronizes display coordinates with another electronic device according to various embodiments.

According to the various embodiments, an electronic device 101 may include at least one camera 1001. The at least one camera has an view area 1003. The electronic device 101 may identify a specified object 1011 (or shape or image thereof) from a scene displayed on a display 1050 of an electronic device 102 which is acquired through a camera angle. The electronic device 101 may identify at least one or two specific objects, such as the object 1011, which is configured for a specific program, in the scene of the display 1050 acquired through the camera.

According to an embodiment, when the electronic device 101 zooms in on a part of a scene displayed on the display 1050 of the electronic device 102 and displays the zoom-in part on the display 150, the electronic device 101 may identify an object (e.g., the object 1011) included in the scene displayed on the display 1050 and may zoom in on a specified region based on the identified object 1011 to display the same on the display 150.

According to various embodiments, when the electronic device 101 identifies at least one object (e.g., the object 1011) displayed on the display 1050 of the electronic device 102, the electronic device 101 is not limited to a specific operation (e.g., an operation of zooming in on the object and displaying the same on the display 150), and various applications, such as using the object as a reference location for displaying a movement of a scene displayed on the display 150, can be made.

Figure 11:
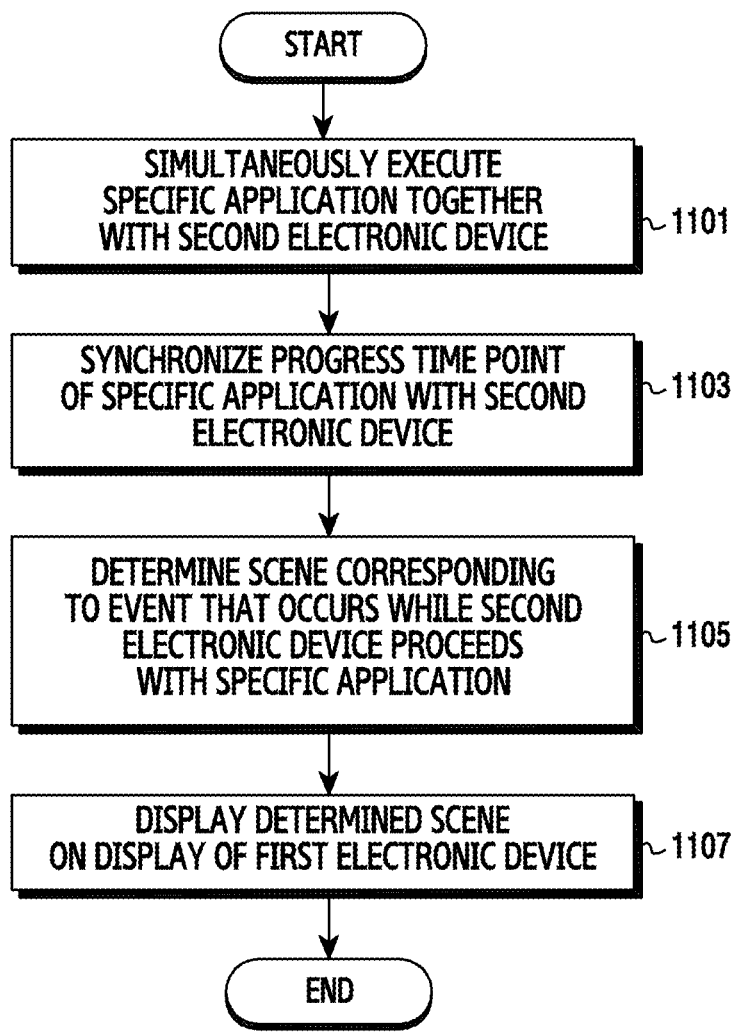
FIG. 11 is a flowchart illustrating an operation of displaying an event of a specific program in an electronic device according to various embodiments.

FIG. 11 is a flowchart illustrating an operation of displaying an event of a specific program in an electronic device according to various embodiments.

In operation 1101, a first electronic device (e.g., electronic device 101) may simultaneously execute (or proceed with) a specific program together with a second electronic device (e.g., electronic device 102) connected thereto through a network communication. Here, although the electronic device 101 may simultaneously execute the specific program together with the electronic device 102 connected thereto through the network communication, the electronic device 101 may also execute the specific program with a time difference. For example, in the simultaneous execution of the specific program, the electronic device 101 may execute the specific program in a state where the specific program has already been executed in the electronic device 102, or the electronic device 102 may execute the specific program in a state where the specific program has already been executed in the electronic device 101.

According to various embodiments, a specific program included in a memory 130 of the electronic device 101 may be the same as that included in a memory of the electronic device 102. In addition, the specific program included in the electronic device 101 may be a program that includes at least some functions of a program included in the electronic device 102. Alternatively, the specific program included in the electronic device 102 may be a program that includes at least some functions of a program included in the electronic device 101. In the progress of a specified event of a specific program, the electronic device 101 and/or the electronic device 102 may independently proceed with specified events using the specific programs included therein.

In operation 1103, the electronic device 101, when proceeding with the specific program, may synchronize a progress time point with the specific program that is currently proceeding in the electronic device 102. According to an embodiment, when performing a specified event in the progress of the specific program, the electronic device 101 and the electronic device 102 may have differing time information despite the performance of the same event. According to an embodiment, the electronic device 101 and the electronic device 102 may have a difference in a time point when an event starts through the specific program. According to an embodiment, the electronic device 101 and the electronic device 102 may have a difference in a program progress speed and/or a data processing speed in the specific program.

Synchronization between the various display and input devices may be executed by maintaining an application-state primarily on one of the devices as a centralized device (ex: the first electronic device or the second electronic device), and transmitting display information from the centralized device to at least one external device. The display information may include actual rendered scenes, or include information on the game-state such that external device may render display screens for the application with local processing. Control information generated by the external device may be transmitted to the centralized device for control of application functions and updating of the application-state. Local states on the external terminal may be regularly checked against and aligned with (e.g., "synchronized" to) the application-state of the centralized device. Thus, the application-state may be synchronized across all involved devices via regular intercommunication for processing control inputs, updating application-states and rendering related display screens.

The electronic device 101 and the electronic device 102 may perform a synchronization operation to share and reconcile information on the progress speed of a specific program, data processing speed, and the time point when an event starts.

In operation 1105, in the execution of the specific program for which the electronic device 101 shares the progress time point with the electronic device 102, the electronic device 101 may determine to display a scene of a specified event on a display (e.g., display 150 of the electronic device 101). The electronic device 101, when determining to display the scene of the specified event on the display 150, may determine a part of a scene displayed on the display of the electronic device 102. For example, the electronic device 101 may determine to enlarge (zoom in) and/or reduce (zoom out) a part of a scene displayed on the display of the electronic device 101. In addition, the electronic device 101 may also determine to display a hidden object (e.g., ghost) at a specific location of the scene displayed on the display of the electronic device 102. The electronic device 101 may determine to display the interior of a specific object. Alternatively, the electronic device 101 may determine to display a scene that shows the rear of a specific object. In addition, the electronic device 101, when determining to display a scene of a specified event on the display 150, may also determine to display a function corresponding to a specific device (or equipment). For example, when performing an event, such as a zoom lens, an infrared filter, a periscope, and radar, which proceeds in a specific program, the electronic device 101 may also determine the role of a desirable device.

In operation 1107, the electronic device 101 may display the determined scene on the display 150. In addition, the electronic device 101 may control the scene displayed on the display 150 based on a user input detected thereby.

The electronic device 101 may complete the embodiment illustrated in FIG. 11 after performing the operation 1107.

Figure 12:
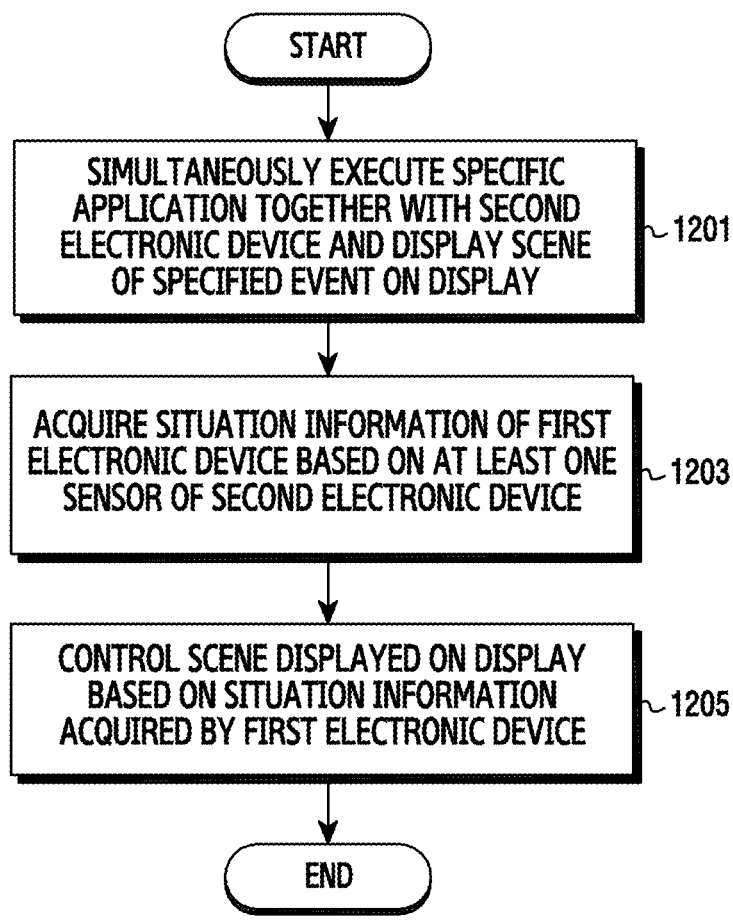
FIG. 12 is a flowchart illustrating an operation of controlling a scene displayed on a display of an electronic device according to various embodiments.

FIG. 12 is a flowchart illustrating an operation of controlling a scene displayed on a display in an electronic device according to various embodiments.

In operation 1201, a first electronic device (e.g., electronic device 101) may simultaneously proceed with a specific program (e.g., a specific application) together with a second electronic device (e.g., electronic device 102) connected thereto through a network communication. The electronic device 101 may display, on a display 150 thereof, a scene of a specified event performed in the specific program. According to an embodiment, the specified event of the specific program may be configured with at least two scenes, and at least one scene may be displayed according to an electronic device that is configured to display the specified event. According to an embodiment, the electronic device 101 and the electronic device 102 may determine a main console and a sub-console when executing the specific program. For example, the electronic device 101 and the electronic device 102 may determine a main console and at least one sub-console based on setting information that can be shared through a network communication. When determining the sub-console, the electronic device 101 and the electronic device 102 may determine the type of sub-console. According to an embodiment, in cases where the electronic device 101 is determined to be a sub-console, the type of electronic device, such as a smart phone, a smart pad, or a wearable device that can be worn on a user's body part, may be determined. When displaying the specified event of the specific program, the electronic device 101 may display, on the display 150, a specified scene based on the determined type of sub-console.

According to various embodiments, in the execution of the operation 1201 of FIG. 12, the electronic device 101 may perform at least some of the operations 1101 to 1107 of FIG. 11.

In operation 1203, the electronic device 101 may acquire situation information thereof through a sensor unit containing one or more sensors. According to an embodiment, in cases where the display 150 for displaying the determined scene is a touch screen, the electronic device 101 may control the scene displayed on the display 150 of the electronic device 101 based on a detected touch input. According to an embodiment, the electronic device 101 may include at least one sensor, such as a gyroscope, a tilt sensor, and an acceleration sensor, which detects a movement of the electronic device, and may detect situation information on the movement of the electronic device 101 as a user input.

In operation 1205, the electronic device 101 may move the scene displayed on the display 150 based on the identified situation information, or may perform an operation corresponding to an input detected from the displayed scene. According to various embodiments, in cases where the electronic device 101 displays, on the display 150, a scene (e.g., a zoom lens, a periscope, etc.) that can be zoomed in/out, the electronic device 101 may enlarge or reduce the scene displayed on the display 150 based on a user input detected by the electronic device 101. According to an embodiment, the electronic device 101 may move the scene displayed on the display 150 thereof based on a direction in which the electronic device 101 moves, as well as rotation, acceleration, a tilt, and/or a speed of the electronic device 101. For example, the electronic device 101 may display, on the display 150, a scene corresponding to a line of sight of a player, or a scene shown through a specific device. In cases where the electronic device 101 detects an operation in which the electronic device rotates or moves leftwards or rightwards based on the acquired situation information, the electronic device 101 may represent the corresponding movement (e.g., a leftward or rightward movement of a line of sight of a user displayed on the display 150).

The electronic device 101 may complete the embodiment of FIG. 12 after performing the operation 1205.

Figure 13:
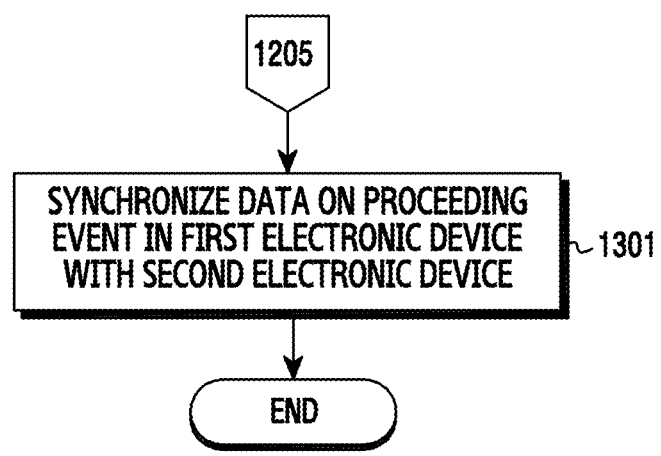
FIG. 13 is a flowchart illustrating an operation of synchronizing a scene of an event in an electronic device according to various embodiments.

FIG. 13 is a flowchart illustrating an operation of synchronizing a scene of an event in an electronic device according to various embodiments.

Operation 1301 may be executed after the scene displayed on the display 150 of the first electronic device (e.g., electronic device 101) is controlled based on the situation information acquired in operation 1205 of FIG. 12.

According to various embodiments, the electronic device 101 may synchronize data corresponding to a specified event performed through a specific program with the second electronic device (e.g., electronic device 102) that performs the same progress time point of the specific program. For example, the electronic device 101 may transmit the data corresponding to the specified event, to the electronic device 102. And, the electronic device 102 may perform an operation corresponding to the specified event based on the data. According to an embodiment, the electronic device 101 may perform the specified event of the specific program based on situation information, and may share (e.g., synchronize) data (e.g., log data) corresponding to the performed event with the electronic device 102. Further, the electronic device 102 having received the log data may apply the contents of the received data to the specified event.

In addition, although it has been described that the operation 1301 is executed after the scene displayed on the display 150 of the electronic device 101 is controlled based on the acquired situation information, it is apparent that the operation 1301 may be executed at any time while the electronic device 101 proceeds with a specific program.

The electronic device 101 may complete the embodiment of FIG. 13 after performing the operation 1301.

Each of the above described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

According to various embodiments of the present disclosure, at least some of the devices or methods according to various embodiment of the present disclosure as defined by the appended claims and/or disclosed herein may be implemented in the form of hardware, software, firm ware, or any combination (e.g., module or unit) of at least two of hardware, software, and firmware. The "module" may be interchangeable with a term, such as a unit, a logic, a logical block, a component, or a circuit. The "module" may be a minimum unit of an integrated component element or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. When an instruction is implemented by one or more processors (for example, the processor 120), one or more processors may execute a function corresponding to the instruction. The computer-readable storage medium may be, for example, the memory 230. At least a part of the programming module may, for example, be implemented (e.g., executed) by a processor. At least a part of the programming module may, for example, include a module, a program, a routine, a set of instructions, or a process for performing at least one function.

The computer-readable storage medium may include magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (e.g., programming module), such as a read only memory (ROM), a random access memory (RAM), and a flash memory; an electrically erasable programmable read only memory (EEPROM); a magnetic disc storage device; any other type of optical storage device; and a magnetic cassette. Alternatively, any combination of some or all of the may form a memory in which the program is stored. Further, a plurality of such memories may be included in the electronic device. In addition, the program instructions may include high class language codes, which can be executed in a computer by using an interpreter, as well as machine codes made by a compiler.

An electronic device, according to various embodiments, may include a computer readable storage medium having a program stored therein for performing: an operation of synchronizing a main scene displayed on a counterpart electronic device connected thereto with the progress of a specific program; an operation of determining a sub-scene relating to the main scene from the specific program; and an operation of displaying the sub-scene on the electronic device.

According to various embodiments, an electronic device may include a computer readable storage medium having a program stored therein for performing: an operation of determining a photographing condition corresponding to a multi-image frame photography mode; an operation of taking a plurality of image frames according to the number of photographing operations included in the determined photographing condition; and an operation of creating an image having a preset resolution based on the plurality of image frames which are taken.

According to various embodiments, when an electronic device performs a specific program along with at least one other electronic device connected thereto through a network communication, the electronic device can provide various scenes corresponding to a proceeding event through two or more displays, thereby increasing a user's sense of immersion relevant to the progress of the specific program.

According to various embodiments, when at least two electronic devices that execute a multi-screen service display screens, at least one electronic device may display a sub-screen that is synchronized with a partial area of a screen on which the multi-screen service is provided. Furthermore, when at least two electronic devices that execute a multi-screen service display screens, at least one electronic device may display a sub-screen for providing an effect configured for a partial area of a screen on which the multi-screen service is provided.

According to various embodiments, electronic devices that perform a multi-screen service have displays of different sizes, respectively, and an electronic device having a small display may display a sub-screen synchronized with a partial area of a screen of an electronic device having a large display.

According to various embodiments, electronic devices that perform a multi-screen service have displays of different sizes, respectively, and an electronic device that has a small display may display a sub-screen for providing an effect of an additional function configured for a partial area of a main screen of an electronic device that has a large display.

According to various embodiments, when a specific program is executed, a specified scene of a proceeding event may be displayed through a display of at least one other electronic device connected through a network communication.

According to various embodiments, an electronic device that executes a specific program and another electronic device may independently proceed with specific events and may share information on the proceeding event.

The present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, various embodiments disclosed in this document are only for the description and understanding of technical contents and do not limit the present disclosure. Accordingly, the present disclosure should be construed as including all modifications or various other embodiments based on the technical idea of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An operating method for a first electronic device, comprising:
    establishing, by the first electronic device, a communication link with a second electronic device;
    synchronizing an image displayed on the second device for display on the first electronic device; and
    in response to determining that a portion of the image is selected on the second electronic device, displaying the selected portion of the image from the second electronic device on the first electronic device; and
    in response to detecting a zoom input on the first electronic device, zooming the selected portion of the image displayed on the first electronic device while maintaining the image displayed on the second device without zoom,
    wherein display of the zoomed selected portion of the image on the first electronic device further includes displaying one or more hidden effect objects situated within the selected portion of the image but undisplayed by the second electronic device.

2. The operating method of claim 1, wherein an application displays the image on the second electronic device, and the application is stored in the first electronic device, and
    wherein prior to detecting selection of the portion of the image, a controller user interface is displayed on the first electronic device, the controller user interface including a plurality of objects each selectable to control at least one operation of the first electronic device, and the controller user interface is removed to display the selected portion of the image when the portion of the image is selected.

3. The operating method of claim 1, wherein the selected portion of the image displayed on the first electronic device enables control of the image being displayed on a display of the second electronic device.

4. The operating method of claim 1, wherein the displaying of the selected portion of the image comprises:
    determining a partial area of the image; and
    changing at least one of a size and a brightness of the determined partial area for display.

5. The operating method of claim 4, wherein the partial area is determined by at least one of a camera photography input and a touch input of the first electronic device, and the determined partial area is displayed as the selected portion of the image through synchronization between the second electronic device and the first electronic device.

6. The operating method of claim 1, wherein the selected portion of the image includes a remote controller configured to control the image.

7. The operating method of claim 1, wherein the displaying of the selected portion of the image comprises:

determining a partial area of an image displayed on the second electronic device; and displaying a preset image to correspond to the determined area.

8. The operating method of claim 1, wherein the displaying of the selected portion of the image comprises acquiring an image to display the selected portion of the image such that the selected portion of the image interworks with the acquired image.

9. The operating method of claim 1, wherein the displaying of the selected portion of the image comprises:

changing the selected portion of the image according to a sensed value of at least one of an acceleration sensor, a tilt sensor, a speed sensor, and a gyroscope sensor of the electronic device; and displaying the changed selected portion of the image.

10. The operating method of claim 1, wherein the displaying of the selected portion of the image comprises:

displaying a new image associated with the image as the selected portion of the image based on at least one of a scenario and an event occurring within an application.

11. A first electronic device comprising:

a communication module;

a display module; and a processor that controls the communication module and the display module, wherein the processor is configured to:

establish, by the first electronic device, a communication link with a second electronic device, synchronize an image displayed on the second device for display on the first electronic device, in response to determining a portion of the image selected on the second electronic device, display the selected portion of the image from the second electronic device on the first electronic device, and in response to detecting a zoom input on the first electronic device, control the display module to display zooming the selected portion of the image while the second device maintains the image without zoom, wherein display of the zoomed selected portion of the image on the first electronic device further includes displaying one or more hidden effect objects situated within the selected portion of the image but undisplayed by the second electronic device.

12. The first electronic device of claim 11, wherein an application displays the image on the second electronic device, and wherein the application is stored in the first electronic device, and wherein prior to detecting selection of the portion of the image, a controller user interface is displayed on the first electronic device, the controller user interface including a plurality of objects each selectable to control at least one operation of the first electronic device, and the controller user interface is removed to display the selected portion of the image when the portion of the image is selected.

13. The first electronic device of claim 11, wherein the selected portion of the image displayed on the first electronic device enables control of the image being displayed on a display of the second electronic device.

14. The first electronic device of claim 11, wherein the processor is configured to determine a partial area of the image and display the selected portion of the image by changing at least one of a size and a brightness of the determined partial area for display.

15. The first electronic device of claim 14, wherein the processor is configured to determine the partial area by at least one of a camera photography input and a user touch input of the first electronic device, and display the partial area as the selected portion of the image through synchronization between the second electronic device and the first electronic device.

16. The first electronic device of claim 11, wherein the selected portion of the image includes a remote controller configured to control the image.

17. The first electronic device of claim 11, wherein the processor is configured to determine a partial area of an image displayed on the second electronic device and display a preset image to correspond to the determined area.

18. The first electronic device of claim 11, wherein the processor acquires an image to display the selected portion of the image such that the selected portion of the image interworks with the acquired image.

19. The first electronic device of claim 11, where the processor changes the selected portion of the image according to a sensed value of at least one of an acceleration sensor, a tilt sensor, a speed sensor, and a gyroscope sensor of the first electronic device and displays the changed selected portion of the image.

20. The first electronic device of claim 11, wherein the processor displays a new image associated with the image as the selected portion of the image based on at least one of a scenario and an event occurring within an application.

* * * * *